(12) United States Patent
Verfuerth

(10) Patent No.: US 8,586,902 B2
(45) Date of Patent: Nov. 19, 2013

(54) OUTDOOR LIGHTING FIXTURE AND CAMERA SYSTEMS

(75) Inventor: Neal R. Verfuerth, Manitowoc, WI (US)

(73) Assignee: Orion Energy Systems, Inc., Manitowoc, WI (US)

(*) Notice: Subject to any disclaimer, the term of this patent is extended or adjusted under 35 U.S.C. 154(b) by 0 days.

(21) Appl. No.: 13/223,135

(22) Filed: Aug. 31, 2011

(65) Prior Publication Data

US 2012/0044350 A1 Feb. 23, 2012

Related U.S. Application Data

(63) Continuation-in-part of application No. 12/550,270, filed on Aug. 28, 2009, now Pat. No. 8,450,670, which is a continuation-in-part of application No. 11/771,317, filed on Jun. 29, 2007, now Pat. No. 7,638,743, and a continuation-in-part of application No. 12/240,805, filed on Sep. 29, 2008, now Pat. No. 8,344,665, which is a continuation-in-part of application No. 12/057,217, filed on Mar. 27, 2008, now Pat. No. 8,406,937, application No. 13/223,135, which is a continuation-in-part of application No. 12/875,930, filed on Sep. 3, 2010.

(60) Provisional application No. 61/275,985, filed on Sep. 4, 2009, provisional application No. 61/380,128, filed on Sep. 3, 2010.

(51) Int. Cl.
*G01J 1/32* (2006.01)
*G08C 19/12* (2006.01)
*G08G 1/017* (2006.01)

(52) U.S. Cl.
USPC .................. 250/205; 340/13.24; 340/937

(58) Field of Classification Search
USPC .......... 250/205, 221; 315/149–159, 292–295, 315/312, 316, 318, 320, 324; 362/217, 427; 340/937, 538.15, 541, 458, 13.24, 340/13.32
See application file for complete search history.

(56) References Cited

U.S. PATENT DOCUMENTS

| 1,254,520 A | 1/1918 | MacDuff |
| 2,403,240 A | 7/1946 | Sawin |

(Continued)

FOREIGN PATENT DOCUMENTS

| GB | 2 237 826 | 5/1991 |
| GB | 2 250 172 | 6/1992 |

(Continued)

OTHER PUBLICATIONS

U.S. Appl. No. 13/249,001, filed Sep. 29, 2011, Verfuerth et al.

(Continued)

*Primary Examiner* — Georgia Y Epps
*Assistant Examiner* — Don Williams
(74) *Attorney, Agent, or Firm* — Foley & Lardner LLP

(57) ABSTRACT

One embodiment of the invention relates to an outdoor lighting fixture that includes a ballast for controlling the amount of current provided to a lamp. The lighting fixture also includes a fixture housing at least partially surrounding the ballast and the lamp and a mounting system for holding the fixture housing to at least one of a wall and a pole. The lighting fixture yet further includes a camera coupled to the housing and a control circuit wired to the camera. The lighting fixture also includes a radio frequency transceiver wired to the control circuit. The control circuit is configured to cause information from the camera to be wirelessly transmitted by the radio frequency transceiver.

20 Claims, 7 Drawing Sheets

(56) References Cited

U.S. PATENT DOCUMENTS

| | | |
|---|---|---|
| 2,485,148 A | 10/1949 | Fralin |
| 2,636,977 A | 4/1953 | Foster |
| 3,292,319 A | 12/1966 | McCarthy |
| 3,337,035 A | 8/1967 | Pennybacker |
| 3,416,266 A | 12/1968 | Eron |
| 3,511,559 A | 5/1970 | Foster |
| 3,757,290 A | 9/1973 | Ross et al. |
| 4,023,043 A | 5/1977 | Stevenson |
| 4,114,186 A | 9/1978 | Dominguez |
| 4,135,181 A | 1/1979 | Bogacki et al. |
| 4,144,462 A | 3/1979 | Sieron et al. |
| 4,190,800 A | 2/1980 | Kelly et al. |
| 4,204,194 A | 5/1980 | Bogacki |
| 4,204,195 A | 5/1980 | Bogacki |
| 4,306,769 A | 12/1981 | Martinet |
| 4,360,881 A | 11/1982 | Martinson |
| 4,387,417 A | 6/1983 | Plemmons et al. |
| 4,489,386 A | 12/1984 | Breddan |
| 4,727,593 A | 2/1988 | Goldstein |
| 4,733,505 A | 3/1988 | Van Dame |
| 4,809,468 A | 3/1989 | Bareiss |
| 4,841,914 A | 6/1989 | Chattan |
| 4,860,511 A | 8/1989 | Weisner et al. |
| 4,883,340 A | 11/1989 | Dominguez |
| 4,998,095 A | 3/1991 | Shields |
| 5,099,622 A | 3/1992 | Sutton |
| 5,253,444 A | 10/1993 | Donoho et al. |
| 5,261,179 A | 11/1993 | Schwinler |
| 5,353,543 A | 10/1994 | Teraoka |
| 5,371,661 A | 12/1994 | Simpson |
| 5,426,620 A | 6/1995 | Budney |
| 5,546,712 A | 8/1996 | Bixby |
| 5,572,438 A | 11/1996 | Ehlers et al. |
| 5,598,042 A | 1/1997 | Mix et al. |
| 5,644,173 A | 7/1997 | Elliason et al. |
| 5,649,394 A | 7/1997 | Ohba |
| 5,655,339 A | 8/1997 | DeBlock et al. |
| 5,713,160 A | 2/1998 | Heron |
| 5,717,609 A | 2/1998 | Packa et al. |
| 5,729,387 A | 3/1998 | Takahashi et al. |
| 5,758,331 A | 5/1998 | Johnson |
| 5,836,114 A | 11/1998 | Ohba |
| 5,918,404 A | 7/1999 | Ohba |
| 5,956,462 A | 9/1999 | Langford |
| 5,962,989 A | 10/1999 | Baker |
| 6,003,471 A | 12/1999 | Ohba |
| 6,122,603 A | 9/2000 | Budike, Jr. |
| 6,169,979 B1 | 1/2001 | Johnson |
| 6,257,735 B1 | 7/2001 | Baar |
| D447,266 S | 8/2001 | Verfuerth |
| 6,363,667 B2 | 4/2002 | O'Neill |
| 6,367,419 B1 | 4/2002 | Gosselin |
| 6,418,674 B1 | 7/2002 | Deraedt |
| D463,059 S | 9/2002 | Verfuerth |
| 6,467,933 B2 | 10/2002 | Baar |
| 6,528,957 B1 | 3/2003 | Luchaco |
| 6,535,859 B1 | 3/2003 | Yablonowski et al. |
| 6,585,396 B1 | 7/2003 | Verfuerth |
| D479,826 S | 9/2003 | Verfuerth et al. |
| 6,622,097 B2 | 9/2003 | Hunter |
| 6,633,823 B2 | 10/2003 | Bartone et al. |
| 6,644,836 B1 | 11/2003 | Adams |
| D483,332 S | 12/2003 | Verfuerth |
| 6,671,586 B2 | 12/2003 | Davis et al. |
| 6,717,660 B1 | 4/2004 | Bernardo |
| 6,731,080 B2 | 5/2004 | Flory |
| D494,700 S | 8/2004 | Hartman et al. |
| 6,785,592 B1 | 8/2004 | Smith et al. |
| 6,813,864 B2 | 11/2004 | Landis |
| 6,828,695 B1 | 12/2004 | Hansen |
| 6,832,135 B2 | 12/2004 | Ying |
| 6,894,609 B2 | 5/2005 | Menard et al. |
| 6,938,210 B1 | 8/2005 | Huh |
| 6,979,097 B2 | 12/2005 | Elam et al. |
| 6,983,210 B2 | 1/2006 | Matsubayashi et al. |
| 6,990,394 B2 | 1/2006 | Pasternak |
| 7,027,736 B1 | 4/2006 | Mier-Langner et al. |
| 7,130,719 B2 | 10/2006 | Ehlers et al. |
| 7,130,832 B2 | 10/2006 | Bannai et al. |
| 7,167,777 B2 | 1/2007 | Budike, Jr. |
| 7,264,177 B2 | 9/2007 | Buck et al. |
| D557,817 S | 12/2007 | Verfuerth et al. |
| 7,307,542 B1 | 12/2007 | Chandler et al. |
| D560,469 S | 1/2008 | Bartol et al. |
| 7,369,056 B2 * | 5/2008 | McCollough, Jr. ........... 340/635 |
| 7,401,942 B1 | 7/2008 | Verfuerth et al. |
| 7,518,531 B2 | 4/2009 | Butzer et al. |
| D595,894 S | 7/2009 | Verfuerth et al. |
| 7,563,006 B1 | 7/2009 | Verfuerth et al. |
| 7,575,338 B1 | 8/2009 | Verfuerth |
| D606,697 S | 12/2009 | Verfuerth et al. |
| 7,628,506 B2 | 12/2009 | Verfuerth et al. |
| 7,638,743 B2 | 12/2009 | Bartol et al. |
| 7,660,652 B2 | 2/2010 | Smith et al. |
| D617,028 S | 6/2010 | Verfuerth et al. |
| D617,029 S | 6/2010 | Verfuerth et al. |
| 7,738,999 B2 | 6/2010 | Petite |
| 7,746,003 B2 | 6/2010 | Verfuerth et al. |
| 7,762,861 B2 | 7/2010 | Verfuerth et al. |
| D621,410 S | 8/2010 | Verfuerth et al. |
| D621,411 S | 8/2010 | Verfuerth et al. |
| 7,780,310 B2 | 8/2010 | Verfuerth et al. |
| 7,784,966 B2 | 8/2010 | Verfuerth et al. |
| D623,340 S | 9/2010 | Verfuerth et al. |
| 7,812,543 B2 | 10/2010 | Budike, Jr. |
| 7,847,706 B1 | 12/2010 | Ross et al. |
| 7,859,398 B2 | 12/2010 | Davidson et al. |
| D632,006 S | 2/2011 | Verfuerth et al. |
| 8,033,686 B2 | 10/2011 | Recker et al. |
| D650,225 S | 12/2011 | Bartol et al. |
| 8,070,312 B2 | 12/2011 | Verfuerth et al. |
| 8,138,690 B2 | 3/2012 | Chemel et al. |
| 8,255,090 B2 | 8/2012 | Frader-Thompson et al. |
| 2001/0055965 A1 | 12/2001 | Delp et al. |
| 2002/0065583 A1 | 5/2002 | Okada et al. |
| 2002/0082748 A1 | 6/2002 | Enga et al. |
| 2002/0103655 A1 | 8/2002 | Boies et al. |
| 2002/0162032 A1 | 10/2002 | Gundersen et al. |
| 2002/0172049 A1 | 11/2002 | Yueh |
| 2003/0011486 A1 | 1/2003 | Ying |
| 2003/0016143 A1 | 1/2003 | Ghazarian |
| 2003/0036820 A1 | 2/2003 | Yellepeddy et al. |
| 2003/0041017 A1 | 2/2003 | Spool et al. |
| 2003/0041038 A1 | 2/2003 | Spool et al. |
| 2003/0046252 A1 | 3/2003 | Spool et al. |
| 2003/0084358 A1 | 5/2003 | Bresniker et al. |
| 2003/0084359 A1 | 5/2003 | Bresniker et al. |
| 2003/0093332 A1 | 5/2003 | Spool et al. |
| 2003/0171851 A1 | 9/2003 | Brickfield et al. |
| 2003/0179577 A1 | 9/2003 | Marsh |
| 2004/0006439 A1 | 1/2004 | Hunter |
| 2004/0024483 A1 | 2/2004 | Holcombe |
| 2004/0076001 A1 | 4/2004 | Lutes |
| 2004/0078153 A1 | 4/2004 | Bartone et al. |
| 2004/0078154 A1 | 4/2004 | Hunter |
| 2004/0083163 A1 | 4/2004 | Cooper |
| 2004/0095237 A1 | 5/2004 | Chen et al. |
| 2004/0128266 A1 | 7/2004 | Yellepeddy et al. |
| 2004/0193329 A1 | 9/2004 | Ransom et al. |
| 2005/0027636 A1 | 2/2005 | Gilbert et al. |
| 2005/0034023 A1 | 2/2005 | Maturana et al. |
| 2005/0035717 A1 | 2/2005 | Adamson et al. |
| 2005/0038571 A1 | 2/2005 | Brickfield et al. |
| 2005/0043860 A1 | 2/2005 | Petite |
| 2005/0124346 A1 | 6/2005 | Corbett et al. |
| 2005/0232289 A1 | 10/2005 | Walko et al. |
| 2006/0044152 A1 | 3/2006 | Wang |
| 2006/0065750 A1 | 3/2006 | Fairless |
| 2006/0085301 A1 | 4/2006 | Leahy |
| 2006/0125426 A1 | 6/2006 | Veskovic et al. |
| 2006/0253885 A1 | 11/2006 | Murphy et al. |
| 2007/0043478 A1 | 2/2007 | Ehlers et al. |
| 2007/0085701 A1 | 4/2007 | Walters et al. |
| 2007/0097993 A1 | 5/2007 | Bojahra et al. |

(56) References Cited

U.S. PATENT DOCUMENTS

| | | |
|---|---|---|
| 2007/0145915 A1 | 6/2007 | Roberge et al. |
| 2007/0222581 A1 | 9/2007 | Hawkins et al. |
| 2008/0143273 A1 | 6/2008 | Davidson et al. |
| 2008/0147465 A1 | 6/2008 | Raines et al. |
| 2008/0183337 A1 | 7/2008 | Szabados |
| 2008/0218317 A1 | 9/2008 | Choi |
| 2008/0266664 A1 | 10/2008 | Winston et al. |
| 2008/0275802 A1 | 11/2008 | Verfuerth et al. |
| 2009/0000217 A1 | 1/2009 | Verfuerth et al. |
| 2009/0147507 A1 | 6/2009 | Verfuerth et al. |
| 2009/0150004 A1 | 6/2009 | Wang et al. |
| 2009/0222142 A1 | 9/2009 | Kao et al. |
| 2009/0243517 A1 | 10/2009 | Verfuerth et al. |
| 2009/0248217 A1 | 10/2009 | Verfuerth et al. |
| 2009/0251066 A1 | 10/2009 | Baaijens et al. |
| 2009/0299811 A1 | 12/2009 | Verfuerth et al. |
| 2009/0315485 A1 | 12/2009 | Verfuerth et al. |
| 2010/0061088 A1 | 3/2010 | Bartol et al. |
| 2010/0246168 A1 | 9/2010 | Verfuerth et al. |
| 2011/0060701 A1 | 3/2011 | Verfuerth et al. |
| 2011/0146669 A1 | 6/2011 | Bartol et al. |
| 2011/0235317 A1 | 9/2011 | Verfuerth et al. |
| 2011/0279063 A1 | 11/2011 | Wang et al. |
| 2012/0037725 A1 | 2/2012 | Verfuerth |
| 2012/0038281 A1 | 2/2012 | Verfuerth |
| 2012/0038490 A1 | 2/2012 | Verfuerth |
| 2012/0040606 A1 | 2/2012 | Verfuerth |
| 2012/0081906 A1 | 4/2012 | Verfuerth et al. |
| 2012/0167957 A1 | 7/2012 | Verfuerth et al. |
| 2012/0274222 A1 | 11/2012 | Verfuerth et al. |
| 2013/0006437 A1 | 1/2013 | Verfuerth et al. |
| 2013/0033183 A1 | 2/2013 | Verfuerth et al. |

FOREIGN PATENT DOCUMENTS

| | | |
|---|---|---|
| JP | 05-336868 | 12/1993 |
| JP | 2010-046091 | 3/2010 |
| WO | WO-2004/023849 A1 | 3/2004 |

OTHER PUBLICATIONS

U.S. Appl. No. 13/275,536, filed Oct. 18, 2011, Verfuerth et al.
U.S. Appl. No. 13/296,058, filed Nov. 14, 2011, Verfuerth et al.
U.S. Appl. No. 13/333,293, filed Dec. 21, 2011, Verfuerth et al.
U.S. Appl. No. 61/466,411, filed Mar. 22, 2011, Verfuerth et al.
"About Sun Dome Tubular Skylights," having a date indication of © 2009, 8 pages.
Deru et al.; BigHorn Home Improvement Center Energy Performance; ASHRAE Transactions, Atlanta: 2006 vol. 112, 26 pages.
Halliday, D., et al., Physics Part I and II; John Wiley & Sons, Inc. 1967 (9 pgs.).
Harris, L. R., et al., "Pacific Northwest Laboratory's Lighting Technology Screening Matrix," PNL-SA-23871, Apr. 1994, U.S. Department of Energy, Pacific Northwest Laboratory, Richland, Washington 99352, pp. 1-14.
Notice of Acceptance (NOA) from Miami-Dade County, Building Code Compliance Office, Product Control Division, Approval Date Dec. 13, 2007, 2 pages.
Sun-Dome /Tubular Skylight, Daylighting Technologies, Riviera Beach, FL, revision Oct. 22, 2007, 1 page.
Galasiu et al. "Energy saving lighting control systems for open-plan offices: a filed study"; Jul. 2007, National Research Council Canada; vol. 4; No. 1, pp. 1-28, 56 pages.
Non-Final Office Action on U.S. Appl. No. 13/902,449, mail date Aug. 28, 2013, 15 pages.
Non-Final Office Action on U.S. Appl. No. 13/932,962, mail date Aug. 28, 2013, 9 pages.

* cited by examiner

OUTDOOR LIGHTING FIXTURE AND CAMERA SYSTEMS

CROSS-REFERENCE TO RELATED PATENT APPLICATIONS

This application claims the benefit of priority under 35 U.S.C. §119(e) of U.S. Provisional Application No. 61/380,128, filed on Sep. 3, 2010, and titled "Outdoor Lighting Fixtures." This Application also claims the benefit of priority as a Continuation-In-Part of U.S. application Ser. No. 12/875,930, filed on Sep. 3, 2010, which claims the benefit of priority of U.S. Application No. 61/275,985, filed on Sep. 4, 2009. This Application also claims the benefit of priority as a Continuation-In-Part of U.S. application Ser. No. 12/550,270, filed on Aug. 28, 2009, which is a Continuation-In-Part of application Ser. No. 11/771,317, filed Jun. 29, 2007, and is also a Continuation-In-Part of U.S. Ser. No. 12/240,805, filed on Sep. 29, 2008, which is a Continuation-In-Part of U.S. application Ser. No. 12/057,217, filed Mar. 27, 2008. The subject matter of Application Ser. Nos. 61/380,128, 61/275,985, 12/875,930, 12/550,270, 12/240,805, 12/057,217, and 11/771,317 are hereby incorporated herein by reference in their entirety.

BACKGROUND

The present invention relates generally to the field of outdoor lighting fixtures.

Observation cameras (e.g., security cameras, traffic cameras, etc.) are conventionally mounted to a high pole or side of a building and are either wired or wirelessly connected to a base station dedicated to the observation camera. It has conventionally been challenging to provide proper light, power, and data communications facilities for observation cameras.

SUMMARY

One embodiment of the invention relates to an outdoor lighting fixture that includes a ballast for controlling the amount of current provided to a lamp. The lighting fixture also includes a fixture housing at least partially surrounding the ballast and the lamp and a mounting system for holding the fixture housing to at least one of a wall and a pole. The lighting fixture yet further includes a camera coupled to the housing and a control circuit wired to the camera. The lighting fixture also includes a radio frequency transceiver wired to the control circuit. The control circuit is configured to cause information from the camera to be wirelessly transmitted by the radio frequency transceiver.

Another embodiment of the invention relates to a kit for installing on an outdoor lighting fixture pole. The kit includes an outdoor lighting fixture configured for mounting to the outdoor lighting fixture pole and having a ballast and at least one lamp. The kit further includes a radio frequency transceiver for wirelessly communicating lighting commands and lighting information to a remote source. The kit also includes a camera for mounting to at least one of the outdoor lighting fixture and the outdoor lighting fixture pole. The kit yet further includes a control circuit wired to the camera and the radio frequency transceiver and configured to cause video information from the camera to be transmitted by the radio frequency transceiver.

Another embodiment of the invention relates to a device for use with an outdoor lighting fixture having a radio frequency transceiver for communicating data information to a remote source. The device includes a camera and a mount for holding the camera to at least one of the outdoor lighting fixture or a pole for the outdoor lighting fixture. The device further includes a control circuit wired to the camera and including memory for storing video from the camera. The device also includes an interface for wiring the control circuit to the radio frequency transceiver of the outdoor lighting fixture. The control circuit is configured to receive video information from the camera and to provide the video information to the radio frequency transceiver via the interface and for communication to the remote source.

Another embodiment of the invention relates to a device for an outdoor lighting fixture. The lighting fixture has a radio frequency transceiver for wirelessly communicating information. The device includes a camera for capturing images, video, or images and video and a mount for holding the camera to at least on of the outdoor lighting fixture or a pole. The device further includes a control circuit having a wired interface to the camera and including memory for storing the captured images, video, or images and video received from the camera via the wired interface. The device also includes a radio frequency transceiver wired to the control circuit. The control circuit is configured to cause the stored images, video, or images and video to be wirelessly transmitted by the radio frequency transceiver.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Referring generally to the Figures, a camera is coupled to an outdoor lighting fixture configured for mounting to a building or high pole. The camera uses power from the power source for the outdoor lighting fixture and a communications interface associated with the outdoor lighting fixture to transmit video information back to a remote source for observation or analysis. The camera may be positioned to look down at an area illuminated by the outdoor lighting fixture.

Figure 1:
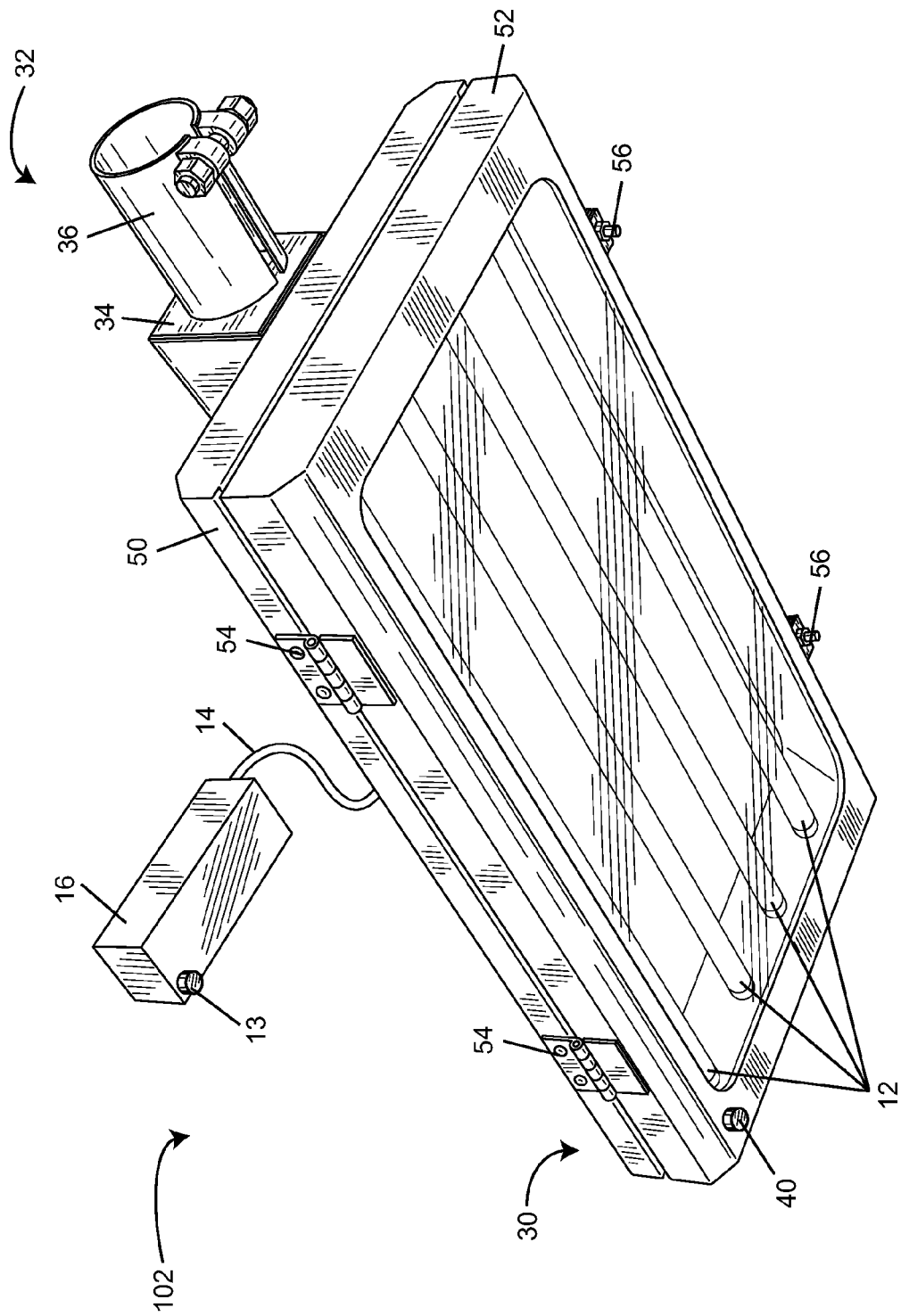
FIG. 1 is a bottom perspective view of an outdoor fluorescent lighting fixture; according to an exemplary embodiment.

Referring now to FIG. 1, a bottom perspective view of an outdoor fluorescent lighting fixture 102 is shown, according to an exemplary embodiment. Outdoor lighting fixture 102 includes a camera 40 for capturing video information (e.g., pictures, video streams, video recordings, etc.). Outdoor lighting fixture 102 may be used for security purposes, traffic camera purposes, observational purposes or otherwise. For example, outdoor fluorescent lighting fixture 102 may be configured for applications such as a street lighting application or a parking lot lighting application. In some embodiments, outdoor fluorescent lighting fixture 102 is configured to include a mounting system 32 for coupling the fluorescent lighting fixture to high poles or masts (e.g., high poles for holding street lights, high poles for holding parking lot lights, etc). Outdoor fluorescent lighting fixture 102 may also be configured to provide wired or wireless communications capabilities, one or more control algorithms (e.g., based on sensor feedback, received wireless commands or wireless messages, etc.), built-in redundancy, and venting. Many of the outdoor lighting fixtures described herein may advantageously mount to existing street light poles or other outdoor structures for holding lighting fixtures such that no modification to the existing infrastructure (other than replacing the lighting fixture itself) is necessary. In some embodiments, the outdoor lighting fixtures include control circuits for providing energy saving control features to a group of lighting fixtures or a municipality without changing existing power wiring run from pole to pole. While many of the embodiments described herein are of a fluorescent lighting fixture, in other embodiments the lighting fixture may be configured for illuminating an area using other lamp technologies (e.g., high intensity discharge (HID), LED, etc.).

In FIG. 1, outdoor lighting fixture 102 is configured for coupling to a pole and for directing substantially toward the ground. Such an orientation may be used to illuminate streets, sidewalks, bridges, parking lots, and other outdoor areas where ground illumination is desirable. Such an orientation may also direct camera 40 generally toward the ground for capturing video information of activity on the ground. Outdoor lighting fixture 102 is shown to include a mounting system 32 and a housing 30. Mounting system 32 is configured to mount fixture 102 including housing 30 to a pole or mast. In an exemplary embodiment, housing 30 surrounds one or more fluorescent lamps 12 (e.g., fluorescent tubes) and includes a lens (e.g., a plastic sheet, a glass sheet, etc.) that allows light from the one or more fluorescent lamps 12 to be provided from housing 30.

Mounting system 32 is shown to include a mount 34 and a compression sleeve 36. Compression sleeve 36 is configured to receive the pole and to tighten around the pole (e.g., when a clamp is closed, when a bolt is tightened, etc.). Compression sleeve 36 may be sized and shaped for attachment to existing outdoor poles such as street light poles, sidewalk poles, parking lot poles, and the like. As is provided by mounting system 32, the coupling mechanism may be mechanically adaptable to different poles or masts. For example, compression sleeve 36 may include a taper or a tapered cut so that compression sleeve 36 need not match the exact diameter of the pole or mast to which it will be coupled. While lighting fixture 102 shown in FIG. 1 utilizes a compression sleeve 36 for the mechanism for coupling the mounting system to a pole or mast, other coupling mechanisms may alternatively be used (e.g., a two-piece clamp, one or more arms that bolt to the pole, etc.).

According to an exemplary embodiment, fixture 102 and housing 30 are elongated and mount 34 extends along the length of housing 30. Mount 34 is preferably secured to housing 30 in at least one location beyond a lengthwise center point and at least one location before the lengthwise center point. In other exemplary embodiments, the axis of compression sleeve 36 also extends along the length of housing 30. In the embodiment shown in FIG. 1, compression sleeve 36 is coupled to one end of mount 34 near a lengthwise end of housing 30.

Housing 30 is shown to include a fixture pan 50 and a door frame 52 that mates with fixture pan 50. In the embodiments shown in the Figures, door frame 52 is mounted to fixture pan 50 via hinges 54 and latches 56. When latches 56 are released, door frame 52 swings away from fixture pan 50 to allow access to fluorescent lamps 12 within housing 30. Latches 56 are shown as compression-type latches, although many alternative locking or latching mechanisms may be alternatively or additionally provided to secure the different sections of the housing. In some embodiments the latches may be similar to those found on "NEMA 4" type junction boxes or other closures. Further, many different hinge mechanisms may be used. Yet further, in some embodiments door frame 52 and fixture pan 50 may not be joined by a hinge and may be secured together via latches 56 on all sides, any number of screws, bolts or other fasteners that do not allow hinging, or the like. In an exemplary embodiment, fixture pan 50 and door frame 52 are configured to sandwich a rubber gasket that provides some sealing of the interior of housing 30 from the outside environment. In some embodiments the entirety of the interior of the lighting fixture is sealed such that rain and other environmental moisture does not easily enter housing 30. Housing 30 and its component pieces may be galvanized steel but may be any other metal (e.g., aluminum), plastic, and/or composite material. Housing 30, mounting system 32 and/or the other metal structures of lighting fixture 102 may be powder coated or otherwise treated for durability of the metal. According to an exemplary embodiment housing 30 is powder coated on the interior and exterior surfaces to provide a hard, relatively abrasion resistant, and tough surface finish.

Housing 30, mounting system 32, compression sleeve 36, and the entirety of lighting fixture 102 are preferably extremely robust and able to withstand environmental abuses of outdoor lighting fixtures. The shape of housing 30 and mounting system 32 are preferably such that the effective projection area (EPA) relative to strong horizontal winds is minimized—which correspondingly provides for minimized wind loading parameters of the lighting fixture.

Ballasts, structures for holding lamps, and the lamps themselves may be installed to the interior of fixture pan 50. Further, a reflector may be installed between the lamp and the interior metal of fixture pan 50. The reflector may be of a defined geometry and coated with a white reflective thermosetting powder coating applied to the light reflecting side of the body (i.e., a side of the reflector body that faces toward a fluorescent light bulb). The white reflective coating may have reflective properties, which in combination with the defined geometry of the reflector, provides high reflectivity. The reflective coating may be as described in U.S. Prov. Pat. App. No. 61/165,397, filed Mar. 31, 2009. In other exemplary embodiments, different reflector geometries may be used and the reflector may be uncoated or coated with other coating materials. In yet other embodiments, the reflector may be a "MIRO 4" type reflector manufactured and sold by Alanod GmbH & Co KG.

The shape and orientation of housing 30 relative to the reflector and/or the lamps is configured to provide a near full cut off such that light does not project above the plane of fixture pan 50. The lighting fixtures described herein are preferably "dark-sky" compliant or friendly.

To provide further resistance to environmental variables such as moisture, housing 30 may include one or more vents configured to allow moisture and air to escape housing 30 while not allowing moisture to enter housing 30. Moisture may enter enclosed lighting fixtures due to vacuums that can form during hot/cold cycling of the lamps. According to an exemplary embodiment, the vents include, are covered by, or are in front of one or more pieces of material that provide oleophobic and hydrophobic protection from water, washing products, dirt, dust and other air contaminants. According to an exemplary embodiment the vents may include GORE membrane sold and manufactured by W.L. Gore & Associates, Inc. The vent may include a hole in the body of housing 30 that is plugged with a snap-fit (or otherwise fit) plug including an expanded polytetrafluoroethylene (ePTFE) membrane with a polyester non-woven backing material.

While various Figures of the present disclosure, including FIG. 1, illustrate lighting fixtures for fluorescent lamps, it should be noted that embodiments of the present disclosure may be utilized with any type of lighting fixture and/or lamps. Further, while housing 30 is shown as being fully enclosed (e.g., having a door and window covering the underside of the fixture), it should be noted that any variety of lighting fixture shapes, styles, or types may be utilized with embodiments of the present disclosure.

The lighting fixture system includes controller 16. Controller 16 is connected to lighting fixture 102 via wire 14. Controller 16 is configured to control the switching between different states of lighting fixture 102 (e.g., all lamps on, all lamps off, some lamps on, etc.). While controller 16 is shown as having a housing that is exterior to housing 30 of lighting fixture 102, it should be appreciated that controller 16 may be physically integrated with housing 30. For example, one or more circuit boards or circuit elements of controller 16 may be housed within, on top of, or otherwise secured to housing 30. Further, in other exemplary embodiments, controller 16 (including its housing) may be coupled directly to housing 30. For example, controller 16's housing may be latched, bolted, clipped, or otherwise coupled to the interior or exterior of housing 30. Controller 16's housing may generally be shaped as a rectangle (as shown), may include one or more non-right angles or curves, or otherwise configured. In an exemplary embodiment, controller 16's housing is made of plastic and housing 30 for the lighting fixture 102 is made from metal. In other embodiments, other suitable materials may be used.

According to various embodiments, controller 16 is further configured to log usage information for lighting fixture 102 in a memory device local to controller 16. Controller 16 may further be configured to use the logged usage information to affect control logic of controller 16. Controller 16 may also or alternatively be configured to provide the logged usage information to another device for processing, storage, or display. Controller 16 is shown to include a sensor 13 coupled to controller 16 (e.g., controller 16's exterior housing). Controller 16 may be configured to use signals received from sensor 13 to affect control logic of controller 16. Further, controller 16 may be configured to provide information relating to sensor 13 to another device.

Referring further to FIG. 1, camera 40 is shown as mounted to the underside of frame 52. In other embodiments camera 40 is mounted to other structures of outdoor lighting fixture 102 (e.g., fixture pan 50, controller 16, etc.). In yet other embodiments camera 40 is not mounted directly to a structure of lighting fixture 102 and is instead coupled to a pole, a building, or another structure nearby outdoor lighting fixture 102 when outdoor lighting fixture 102 is mounted. In such embodiments camera 40 is connected to a control circuit of outdoor lighting fixture 102 (e.g., circuitry in controller 16) via a wired link. In the embodiment of FIG. 1, camera 40 is shown as a small circular camera mounted on the corner of frame 52; according to various exemplary embodiments, camera 40 may be of a different size, shape, or configuration. Camera 40 may be implemented using any suitable technology for capturing video information. For example, camera 40 may be or include a charge-coupled device (CCD), a video pick-up tube, a complementary metal-oxide-semiconductor (CMOS), a passive pixel sensor, an active pixel sensor, a bayer sensor, or an image sensor of any other suitable technology. Camera 40 is shown as a fixed-position camera configured to aim in the installed direction and for monitoring a specific area (e.g., the area illuminated by outdoor lighting fixture 102). In other embodiments camera 40 may be configured to pan, tilt, zoom (e.g., a pan-tilt-zoom (PTZ) camera) or otherwise move, adjust, or change positions.

Figure 2:
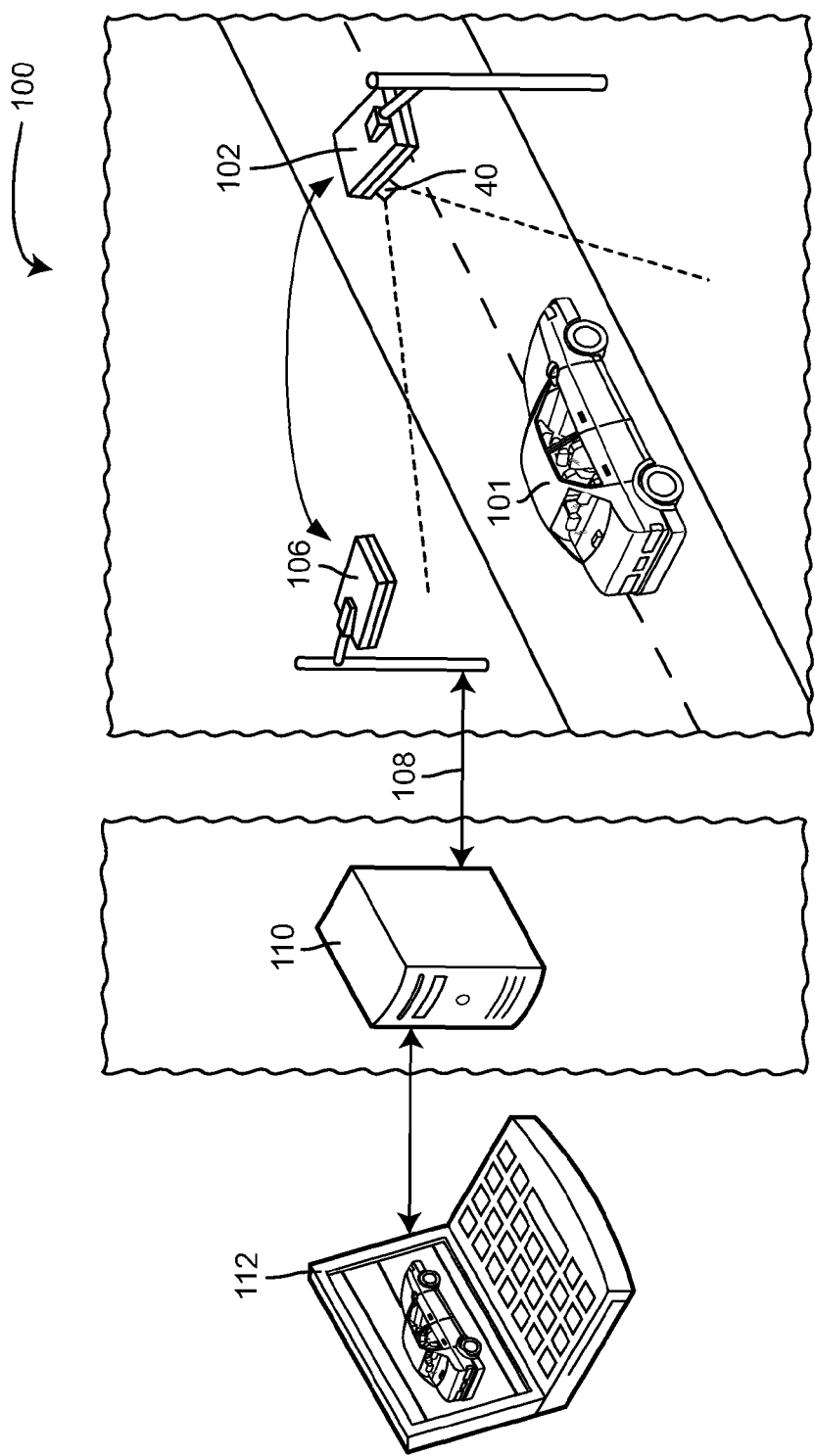
FIG. 2 is an illustration of an outdoor lighting fixture including a camera, according to an exemplary embodiment.

In FIG. 2, an illustration of an outdoor lighting fixture system 100 is shown to include outdoor lighting fixtures 102, 106, according to an exemplary embodiment. Outdoor lighting fixtures 102, 106 are mounted to street light poles via mounting systems and are aimed to illuminate the road. Camera 40 is aimed to capture video of vehicles in the road such as vehicle 101. The video captured by camera 40 is provided to a control circuit of outdoor lighting fixture 102 that is wired to camera 40. Outdoor lighting fixture 102 further includes a radio frequency transceiver wired to the control circuit. The control circuit causes video information from the camera 40 to be wirelessly transmitted by the radio frequency transceiver in outdoor lighting fixture 102.

In the illustration of FIG. 2, a user interface provided by client device 112 is configured to receive the video information captured by camera 40 for playback. The video information is relayed to client device 112 via outdoor lighting fixture 106, communications network 108, and server 110 prior to arriving at client device 112. Outdoor lighting fixture 102, and more particularly the control circuit and radio frequency transceiver of outdoor lighting fixture 102, are configured to relay the video information to outdoor lighting fixture 106. Outdoor lighting fixture 106 has a wired connection to a data communications network 108 (e.g., an Internet service provider, a provide WAN, etc.). The video information can be relayed through data communications network 108 or other data communication links and arrive at server 110. Server 110 may be configured to store video information from many outdoor lighting fixture cameras. Server 110 can include a web service, a video streamer, or another service for allowing client device 112 to access and playback the video information stored with server 110. To avoid running a high speed wired data communication link such as link 108 to each outdoor lighting fixture in an area, the outdoor lighting fixtures in an area can each be configured to wirelessly route information to a "base station" or, as shown in FIG. 2, an outdoor lighting fixture 106 having the connection to the high speed wired data communication link. In some embodiments the radio frequency transceivers and control circuits of outdoor lighting fixture 102 transmits data addressed for outdoor lighting fixture 106. In other embodiments the radio frequency transceivers and control circuits of outdoor lighting fixture 102 broadcast video information with an address for server 110. In such embodiments, as long as at least one other outdoor lighting fixture is configured to receive and relay information in a network of outdoor lighting fixtures, the video information will be routed to outdoor lighting fixture 106 having the high speed data connection and thereafter routed to server 110 via data communications link 108. Each radio frequency transceiver in the network can be configured to support such a rebroadcast capability. For example, the network of outdoor lighting fixtures can have a meshed networking topology such that the network is self-routing or self-healing. In other words, each node in the network can determine how to best transmit video information back to an intended recipient. In some cases and with some network conditions video information from an originating node can take a first path and in other cases and with other network conditioning the video information from the same originating node may take a second path to the same recipient node. The outdoor lighting fixtures of an outdoor lighting fixture network can be arranged in a point-to-point, master-slave, or other relationship. In an exemplary embodiment the radio frequency transceivers are configured for peer-to-peer communication with other radio frequency transceivers of other outdoor lighting fixtures and the control circuit is configured to cause the information from the camera to be wirelessly transmitted to the remote source (e.g., server 110) via the peer-to-peer communication with the other radio frequency transceivers of the other outdoor lighting fixtures (e.g., outdoor lighting fixture 106).

Outdoor lighting fixture 102 additionally includes a sensor 13 (shown in FIG. 1) for detecting motion of an object (e.g., vehicle 101, people, etc.). Sensor 13 provides a sensor output to the control circuit of outdoor lighting fixture 102 (e.g., via a wired connection). The control circuit of outdoor lighting fixture 102 can process the sensor output to determine if the sensor output is representative of motion in the area. In response to a determination of motion in the area, the control circuit can change an operational state associated with camera 40. For example, changing an operational state associated with camera 40 can include one or more of powering-up the camera, storing video captured by the camera in a persistent memory device of the outdoor lighting fixture, marking the video, and transmitting the video to a remote source. Such logic can advantageously prevent camera 40 from recording at all times or can help distinguish video information of interest from video information with no significant activity. In some exemplary embodiments the control circuit is further configured to cause an indication of motion to be transmitted to a remote source in response to the determination of motion. For example, the control circuit and the radio frequency transceiver may broadcast the indication of motion to a network of radio frequency transceivers associated with other outdoor lighting fixtures. Cameras for those other outdoor lighting fixtures can also be configured to change an operational state of their cameras and to be ready to capture the motion. Yet further, the other outdoor lighting fixtures can be configured to fully illuminate in response to receiving an indication of motion from a remote source. For example, an outdoor lighting fixture may be configured to switch from a dimmed or off state of operation to a brighter or fully illuminated state of operation. The control circuit for outdoor lighting fixture 102 can be configured to transmit the indication of motion to the other outdoor lighting fixtures or to another remote source with at least one of an outdoor lighting fixture identifier and a zone identifier associated with the outdoor lighting fixture. Receiving devices can use the received identifier or identifiers to determine whether the motion relates to a nearby fixture or whether the received motion indication should be ignored. In an exemplary embodiment the control circuit of a receiving outdoor lighting fixture will compare the identifier (e.g., zone identifier) to a stored zone identifier of its own. If the motion occurred in the same zone, the control circuit will cause its local camera to begin recording and/or will fully illuminate a ballast of the fixture.

Client device 112 may be used to view the camera data or to provide camera 40 or the control circuit of outdoor lighting fixture 102 with commands. For example, client device 112 may provide a display of camera data (e.g., a slideshow of pictures, a near real-time view of streaming video from camera 40, motion information relating to vehicle 100 as detected or calculated by motion sensor 13, camera 40 and the control circuit, etc.). Client device 112 may further provide a user interface for allowing a user to provide control instructions or commands to the control circuit associated with sensor 13 or camera 40. For example, client device 112, via server 110, data communications network 108, and outdoor lighting fixture 106 may be configured to control outdoor lighting fixture 102 including camera 40. A user may view the data for the camera on client device 112 and provide client device 112 with user input to create camera instructions (e.g., an instruction for the camera to take various photos of the area, an instruction to follow vehicle 101 for as long as possible, an instruction for the camera to stay focused on a specific area for a specific time period, etc.), lighting fixture instructions (e.g., an instruction for a lighting fixture to stay in an illuminated state for a fixed or variable length of time based on the presence of vehicle 101, an instruction for a lighting fixture to turn off, etc.), or other outdoor lighting fixture system 100 instructions. Camera instructions may further include changing the zoom of camera 40 (e.g., zooming in or out on vehicle 101), panning camera 40 across a specific area (e.g., the area surrounding vehicle 101), tilting camera 40 (e.g., such that camera 40 shows a different angle of vehicle 101), or otherwise changing the position or configuration of camera 40. Outdoor lighting fixture instructions may also include instructions to provide lighting (e.g., by a secondary ballast of outdoor lighting fixture 102, by outdoor lighting fixture 106, etc.) such that camera 40 may better record an event or object, instructions to change lighting fixture status between an on state, an off state, and a dimmed state, etc.

Referring further to FIG. 2, each outdoor lighting fixture, camera, or radio frequency transceiver in a network or area can be associated with a unique identifier. The unique identifier can be associated with a location (e.g., a longitude/latitude coordinate, a GPS coordinate, a coordinate on a city grid, etc.) and stored in memory of a server 110 or master controller (e.g., master controller 202 shown in FIG. 5 or 6). The identifier or location or the identifier/location association can also or alternatively be stored in memory of the outdoor lighting fixture 102. Using the identifiers and locations, the server 110 can generate a map for display on a graphical user interface shown on an electronic display system of client device 112. The server 110 may cause the map graphic to include indicia for the outdoor lighting fixture or camera (e.g., an icon), to include indicia for whether the camera is active (e.g., a green icon, a highlighted icon, a text descriptor "camera active", etc.), or to show the motion status for the motion sensor (e.g., "detecting motion"). The server 110 may also allow user selection of an outdoor lighting fixture or camera for viewing the camera's video information, or may allow for "still" or streaming video to be shown in small windows on a map. When stills or streaming video are shown on the map, the server 110 can allow for the user to select, playback or enlarge one or more video streams of interest.

Referring still to FIG. 2, server 110 may be configured to provide a graphical user interface to client device 112 for manipulating the camera in a way that the camera can be used to inspect structures of the outdoor lighting fixture 102. For example, one or more pan, tilt, or zoom controls may be provided by server 110 to the graphical user interface for receiving user commands. Using the controls, a technician may be able to change the camera from focusing on, e.g., a street, to focusing on the fixture's lamps, the ballasts, the mounting system, other lighting fixtures (e.g., a fixture across the street, etc.). Using these views, the technician may be able to determine if the lighting fixture is responding properly to commands (e.g., turn on, turn off), has a burnt-out or otherwise expired lamp, or may be able to conduct other observation or testing (e.g., testing a time-out feature of the fixture).

Figure 3A:
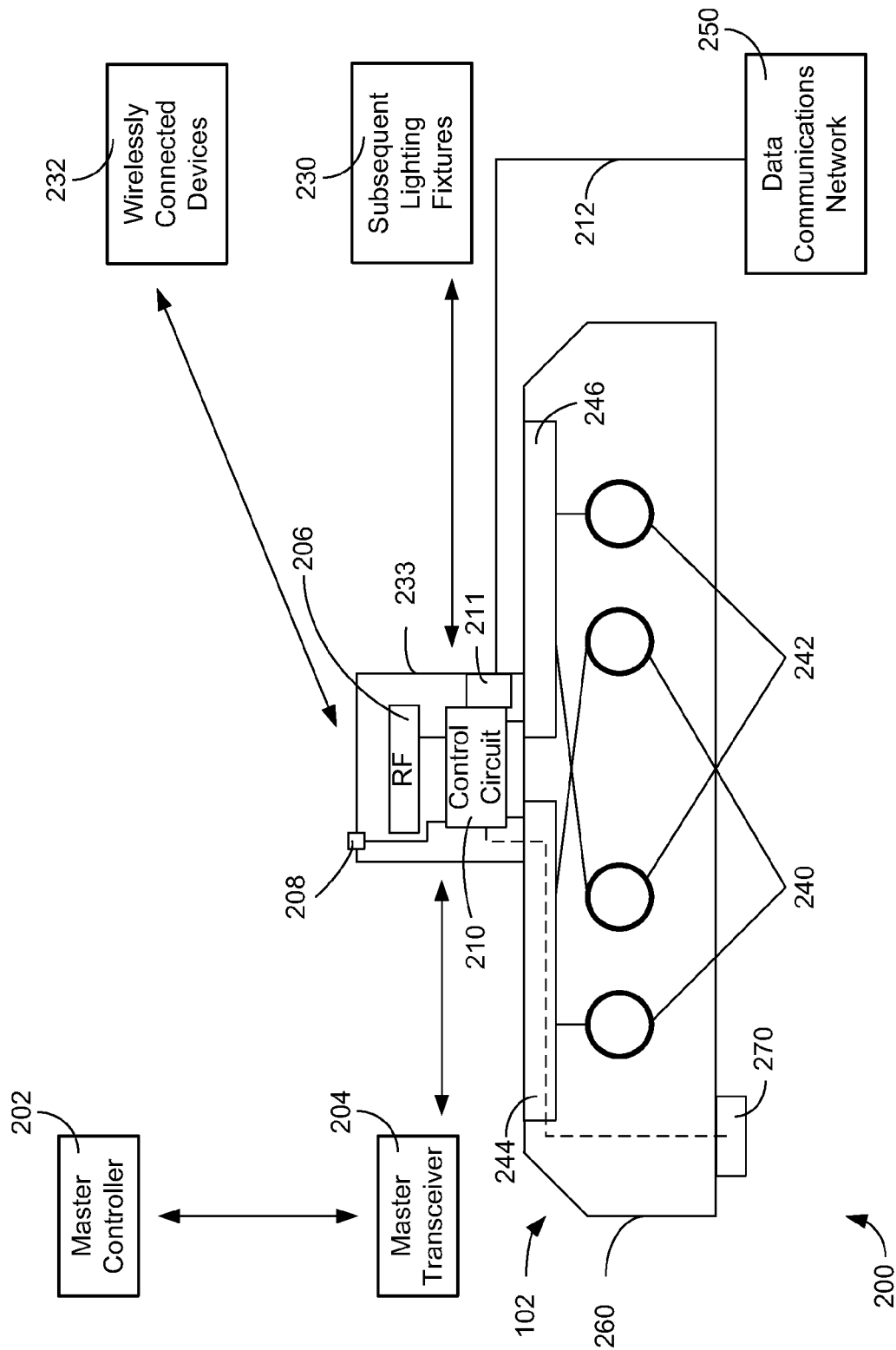
FIG. 3A is a more detailed block diagram of the lighting fixture of FIGS. 1-2, according to an exemplary embodiment.

FIG. 3A is a diagram of another outdoor lighting fixture 200, according to an exemplary embodiment. Outdoor lighting fixture 200 is shown to include housing 260 and mounting system 233 (e.g., these may be similar to or different from the housing and mounting system shown in FIGS. 1 and 2). Control circuit 210 for lighting fixture 200 is shown inside mounting system 233 (as opposed to being housed within controller 16 as shown in FIG. 1). In an exemplary embodiment control circuit 210 is user-accessible via an opening in the top of mounting system 233. The diagram shown in FIG. 3A illustrates two lamp sets 240, 242 with two fluorescent lamps forming each lamp set 240, 242. Each lamp set 240, 242 may include one or any number of additional lamps. Lighting fixture 200 further includes two ballasts 244, 246. Further, while some embodiments described herein relate to providing redundant lamp sets and ballasts, it should be appreciated that many embodiments of the present disclosure may only include a single lamp set and a single ballast. In other embodiments more than two ballasts and lamp sets may be included in a single lighting fixture. While the fluorescent lamps are illustrated as tube lamps extending lengthwise relative to the lighting fixture, the fluorescent lamps may be compact fluorescent bulbs, run perpendicular to the length of the lighting fixture, lamps of a different technology, or may be otherwise oriented.

Control circuit 210 is coupled to ballasts 244, 246 and is configured to provide control signals to ballasts 244, 246. Control circuit 210 may operate by controllably switching the relay from providing power to ballasts 244, 246 to restricting power to ballasts 244, 246 and vice versa. Control circuit 210 is further shown to include radio frequency transceiver 206 communicably connected to control circuit 210. According to an exemplary embodiment, the system shown in FIG. 3A is configured to receive control signals from a master controller 202 or a master transceiver 204 via radio frequency transceiver 206. In other embodiments outdoor lighting fixture 200 shown in FIG. 3A is also configured to provide information to one or more remote sources such as other outdoor lighting fixtures via radio frequency transceiver 206.

In an exemplary embodiment radio frequency transceiver 206 is a ZigBee transceiver configured for wireless meshed networking. In other embodiments radio frequency transceiver 206 operates according to a WiFi protocol, a Bluetooth protocol, or any other suitable protocol for short or long range wireless data transmission. Outdoor lighting fixture 200 is further shown to include a wired uplink interface 211. Wired uplink interface 211 may be or include a wire terminal, hardware for interpreting analog or digital signals received at the wire terminal, or one or more jacks, connectors, plugs, filters, or other hardware (or software) for receiving and interpreting signals received via the wire 212 from a remote source. Radio frequency transceiver 206 may include an encoder, a modulator, an amplifier, a demodulator, a decoder, an antenna, one or more filters, one or more buffers, one or more logic modules for interpreting received transmissions, and/or one or more logic modules for appropriately formatting transmissions. Control circuit 210 shown in FIG. 3A is shown as being entirely enclosed within mounting system 233 and as a single unit (e.g., single PCB, flexible PCB, separate PCB's but closely coupled). In other embodiments, however, control circuit 210 may be distributed (e.g., having some components outside of the mounting system, having some components within the fixture housing, etc.).

FIG. 3A is further shown to include an environment sensor 208. Environment sensor 208 is shown as located at the top of the mounting system 233. In other embodiments, environment sensor 208 may be installed within housing 260, to the underside of housing 260, or to any other part of outdoor lighting fixture 200. In yet other embodiments, environment sensor 208 may be remote from the fixture itself (e.g., coupled to a lower location on the pole, coupled to a street sign, coupled to a stop light, etc.). It should further be mentioned that one environment sensor 208 may serve multiple fixtures. This may be accomplished by environment sensor 208 directly providing wired or wireless output signals to multiple fixtures or by the environment sensor providing output signals to a single fixture (e.g., fixture 200) which is configured to forward the signals (or a representation or message derived from the signals) to other fixtures or to a master controller 202 for action. Environment sensor 208 may be an occupancy sensor, a motion sensor, a photocell, an infrared sensor, a temperature sensor, or any other type of sensor for supporting the activities described herein. Control circuit 210 coupled to environment sensor 208 may be configured to cause lamps 240, 242 to illuminate when movement is detected or based on some other logic determination using sensor input. In an exemplary embodiment, control circuit 210 may also be configured to cause signals to be transmitted by radio frequency transceiver 206 to a security monitor observed by security personnel. Receipt of these signals may cause a system controlling a pan-tilt-zoom security camera (e.g., camera 270) to aim toward the area covered by a light. The signals (or other alerts) may also be sent to other locations such as a police station system for action. For example, if activity continues occurring in a parking lot after-hours, as detected by motion sensors on a system of outdoor lighting fixtures as described herein, the outdoor lighting fixtures can each communicate (wired, wirelessly, etc.) this activity to master transceiver 204 and master controller 202 may make a determination to send a request for inspection to security or police. Control circuit 210 may also be configured to turn lighting fixture 102 on for a period of time prior to turning lighting fixture 102 off if no further occupancy or motion is detected.

Camera 270 is shown coupled to the bottom side of housing 260 and may be connected to control circuit 210 either via a wireless or wired connection. Camera 270 may alternatively be coupled to housing 260 or elsewhere on lighting fixture 200. Camera 270 may provide control circuit 210 with video and/or still photos for transmission to other lighting fixtures 230, to a master controller 202 via a master transceiver 204, a data communications network 250 via interface 211, or other devices 232 wirelessly connected to lighting fixture 200.

Figure 3B:
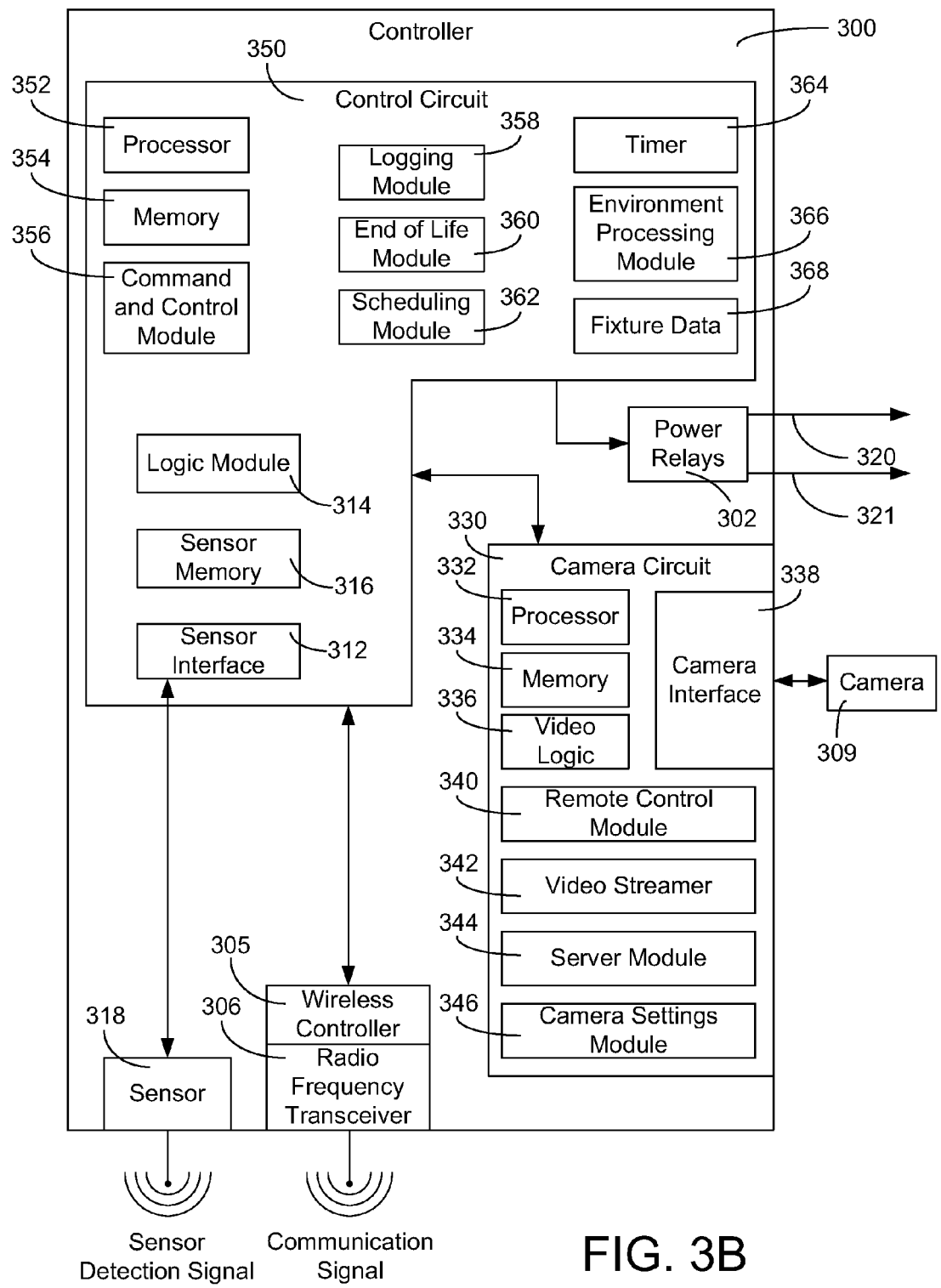
FIG. 3B is a block diagram of a lighting fixture controller and circuit, according to an exemplary embodiment.

Referring now to FIG. 3B, a block diagram of another controller 300 for an outdoor lighting fixture is shown, according to an exemplary embodiment. Controller 300 includes control circuit 350, power relays 302, camera circuit 330, sensor 318, wireless controller 305, and radio frequency transceiver 306. In some embodiments activities of circuit 350 are controlled or facilitated using one or more processors 352 (e.g., a programmable integrated circuit, a field programmable gate array, an application specific integrated circuit, a general purpose processor, a processor configured to execute instructions it receives from memory, etc.). In other embodiments, activities of circuit 350 are controlled and facilitated without the use of one or more processors and are implemented via a circuit of analog and/or digital electronics components. Memory 354 of circuit 350 may be computer memory, semiconductor-based, volatile, non-volatile, random access memory, flash memory, magnetic core memory, or any other suitable memory for storing information.

Controller 300 is shown to include a camera circuit 330 for receiving camera data and video information from camera 309 and processing the camera data and video information. The video information or camera data may then be provided to circuit 350 for transmission via RF transceiver 306 to a remote source or another lighting fixture. Circuit 350 may further receive the camera data and perform additional processing or analysis of the camera data. For example, circuit 350 may use the video information or camera data to determine whether to change a lighting fixture status (turning the lighting fixture on or off, activating an extra ballast or lamp, etc.), to determine whether to change a schedule of the lighting fixture, or to make other control determinations.

Camera circuit 330 includes a camera interface 338 for communicating with a camera 309 connected (either via a wired connection or wirelessly) to controller 300. Camera interface 338 receives video information or camera data such as camera settings data, the current tilt or zoom of the camera, or the like. Camera interface 338 may be a wired interface such as a Ethernet interface, a digital video jack, an optical video connection, a USB interface, or another suitable interface for receiving video information from camera 309. In alternative embodiments, camera interface 338 is a wireless interface for receiving data from the camera via a wireless connection. In yet other embodiments camera 309 is a part of camera circuit 330 (e.g., rigidly coupled to the circuit board of circuit 330).

Camera circuit 330 further includes modules (e.g., integrated circuits, computer code modules in a memory device and for execution by a processor, etc.) for processing the camera data received by camera interface 338. Camera circuit 330 includes processor 332 for executing computer codes of the various modules of camera circuit 330, processing video information received from camera 309, or to complete the execution of other activities described herein. For example, processor 332 may remove noise from the video signal (e.g., denoising), increase or decrease the brightness or contrast of the video signal or images (e.g., to improve the view provided by the video signal), resize or rescale the video signal or images (e.g., increasing the size such that a particular object in the video signal is more easily seen, interpolating the image, etc.), or perform other processing techniques on the video signal and images (e.g., deinterlacing, deflicking, deblocking, color grading, etc.). Processor 332 may then provide the processed video signal or images to circuit 350 for transmitting to a remote source via radio frequency transceiver 306, may provide the video information to video logic 336 for video analysis, may store the video in memory 334 for later use, or may conduct another activity described herein using the processed video information. Memory 334 may be configured to store all video information or camera data received by camera circuit 330, some of the video information or camera data received by camera circuit 330, relevant video information or camera data selected by video logic 336, all video information or camera data for a given time frame, all video information or camera data associated with a particular object within the video, or otherwise. For example, memory 334 may be configured to store all camera data that has a timestamp within the past hour, past 24 hours, past week, or within any other time frame. In another example, video logic 336 may retain all video information or camera data associated with a particular vehicle recorded by the camera, retain all camera data with a specific timestamp range (e.g., all data with a timestamp within a period of time in which sensor 318 detected motion), etc.

Video logic 336 receives the video information or camera data from camera interface 338 or from processor 332 and analyzes the data. The analysis of the video information may include the detection of an object within the video (either stationary or moving) or the detection of an event occurring in the area captured by the video. For example, video logic 336 may be used to identify a vehicle or license plate, and may provide circuit 350 with data regarding the vehicle (e.g., how fast the vehicle was appearing to move, the direction in which the vehicle was traveling, etc.) or the license plate. Video logic 336 may include logic for determining which portions of a video signal and/or which images best represent a tracked object.

Camera circuit 330 further includes remote control module 340. Remote control module 340 is configured to allow for remote control of camera 309. Remote control of camera 309 may include adjusting the positioning, tilt, or zoom of the camera, adjusting when a camera records video, adjusting a camera resolution, stopping recording, starting recording, or initiating or changing any other camera activity. Remote control module 340 may be configured to serve or otherwise provide user interface controls or user interface options to a remote source for adjusting the camera settings. Remote control module 340 may receive an input from the user at the user interface controls or options and interpret the input (e.g., determine an adjustment to be made to camera 309). Remote control module 340 may then cause camera circuit 330 and camera interface 338 to adjust camera 309 or remote control module 340 can cause changes to be made via other modules of camera circuit 330 such as camera settings module 346.

Camera circuit 330 further includes video streamer 342 configured to process the video information from camera 309 and to provide a stream of the video to a remote source communicating with controller 300 (e.g., communicating wirelessly). Video streamer 342 may process or otherwise prepare the stream of video information for streaming to the remote source. For example, video streamer 342 may compress the video for streaming, packetize the video for streaming, and wrap the packetized video according to a video streaming protocol compatible with the remote source. Video streamer 342 may further be configured to negotiate and maintain a data streaming connection with the remote source.

Camera circuit 330 further includes server module 344 for serving video information and/or related user interfaces to a remote source. Server module 344 may be, for example, a web server or web service configured to respond to requests for video information or user interfaces using one or more world wide web communications protocols. For example, server module 344 may respond to http requests by providing http formatted responses. Server module 344 may be used to establish the streaming connection or streaming service provided by video streamer 342.

Camera circuit 330 is further shown to include camera settings module 346. Camera settings module 346 is configured to receive commands provided to controller 300 by a remote source and relating to camera settings. Camera settings module 346 can update stored camera settings or change the "live" behavior of the camera in response to the received commands. For example, radio frequency transceiver 306 can receive a command for the camera to change the default pan, tilt, and zoom settings of the camera from a remote source. Radio frequency transceiver 306 and wireless controller 305 can provide the command to the control circuit 350 which may route the command to camera circuit 330 and more particularly camera settings module 346. Camera settings module 346 can parse the command and set the pan, tilt, and zoom parameters for the camera by updating variables stored in memory 334 and/or providing the new parameters to camera 309 via camera interface 338. Other adjustable camera settings may include a timeframe under which the camera should record video, video settings such as the resolution of the video, the desired frames per second (FPS) of the video, the brightness, contrast, or color setting of the video, and/or a default position, tilt, and zoom set for the camera. Camera settings module 346 can also automatically update settings for the camera in response to received user commands regarding other settings. For example, if the zoom of camera 309 is changed via user command, camera settings module 346 can include logic for determining that, for example, the brightness of the video at the new zoom setting should be adjusted. Camera settings module 346 may be further used to adjust photo settings for the camera. Photo settings may include a size or resolution of the photos, the brightness, contrast, or color settings of the photos, etc. Photo settings further includes rules or logic for when to take photos or "stills" of video information. For example, photos may be taken by the camera on a scheduled interval, at specific pre-determined times, or when an object is detected and is in the view of the camera. Such settings can be set, changed, and maintained by camera settings module 346.

Circuit 350 is further shown to include a command and control module 356, logging module 358, an end of life module 360, a scheduling module 362, a timer 364, an environment processing module 366, and fixture data 368. Using signals received from communications electronics of the lighting fixture and/or signals received from one or more sensors (e.g., photocells, occupancy sensors, etc.), command and control module 356 is configured to control the ballasts and lamps of the lighting fixture. Command and control module 356 may include the primary control algorithm/loop for operating the fixture and may call, initiate, pass values to, receive values from, or otherwise use the other modules of the circuit. For example, command and control module 356 may primarily operate the fixture using a schedule as described below with respect to scheduling module 362, but may allow upstream or peer control (e.g., "override control") to allow a remote source to cause the ballast/lamps to turn on or off. Command and control module 356 may be used to control 2-way communication using communications electronics of the lighting fixture.

Command and control module 356 may further receive data from camera circuit 330 or from a user of a remote source connecting to controller 300 and may adjust the control of the ballasts and lamps (e.g., if camera data or a user command indicates a desire to turn on the lamps of the lighting fixture for the benefit of a camera recording video). For example, if camera data and/or sensor 318 indicate there is a vehicle approaching the lighting fixture, command and control module 356 may provide a command to change the lighting fixture state to a dimmed state or an "on" state. Command and control module 356 may further change the lighting fixture state based on other camera data and/or sensor 318 data (e.g., other detected motion, an ambient light level, etc.).

Logging module 358 is configured to identify and store fixture event information. For example, logging module 358 may be configured to identify (e.g., by receiving a signal from another component of the circuit) when the lamps of the fixture are being or have been turned off or turned on. These events may be recorded by logging module 358 with a date/time stamp and with any other data. For example, logging module 358 may record each event as a row in a two dimensional table (e.g., implemented as a part of a relational database, implemented as a flat file stored in memory, etc.) with the fields such as event name, event date/time, event cause, event source. One module that may utilize such information is end of life module 360. End of life module 360 may be configured to compile a time of use total by querying or otherwise aggregating the data stored by logging module 358. Events logged by the system may be transmitted using the communications interfaces or other electronics to a remote source via a wired or wireless connection. Messages transmitting logged events or data may include an identifier unique to the lighting fixture (e.g., lighting fixture's communication hardware) that identify the fixture specifically. In addition to the activities of end of life module 360, command and control module 356 may be configured to cause communications electronics of the fixture to transmit messages from the log or other messages upon identifying a failure (e.g., a power supply failure, a control system failure, a ballast failure, a lamp failure, etc.). While logging module 358 may be primarily used to log on/off events, logging module 358 (or another module of the control system) may log energy draw (or some value derived from energy draw such as a carbon equivalent amount) by the lighting fixture. In an exemplary embodiment, logging module 358 logs information relating to camera circuit 330. For example, logging module 358 can log times when video logic 336 determined that motion was present in a captured scene, log the times when camera 309 was caused to be active based on motion detected using sensor 318, or log other activities relating to camera circuit 330 or camera 309.

In an exemplary embodiment, controller 300 (e.g., via RF transceiver 306) is configured to transmit the logged usage information to remote devices such as master controller 202 of FIG. 3A. Wireless controller 305 may be configured to recall the logged usage information from memory 316 at periodic intervals (e.g., every hour, once a day, twice a day, etc.) and to provide the logged usage information to RF transceiver 306 at the periodic intervals for transmission back to master controller 202. In other embodiments, master computer 202 (or another network device) transmits a request for the logged information to RF transceiver 306 and the request is responded to by wireless controller 305 by retrieving the logged usage information from memory 316. In a preferred embodiment a plurality of controllers such as controller 300 asynchronously collect usage information for their fixture and master controller 202, via request or via periodic transmission of the information by the controllers, gathers the usage information for later use.

FIG. 3B is further shown to include a scheduling module 362. Scheduling module 362 may be used by the circuit to determine when the lamps of the lighting fixture should be turned on or off Scheduling module 362 may only consider time, or may also consider inputs received from environment sensor 318 (e.g., indicating that it is night out and that artificial light is necessary), a camera connected to controller 300 (e.g., a request from the camera to illuminate an area so that video of an area or event can be recorded), or from another source. Scheduling module 362 may access a schedule stored in memory 354 of the circuit to carry out its tasks. In some embodiments schedule data may be user-updatable via a remote source and transmitted to the fixture via the circuit and a communications interface. While end of life module 360 may utilize an actual log of fixture events as described in the previous paragraph, in some embodiments end of life module 360 may utilize scheduling information to make an end of life determination. In yet other embodiments, logging module 358 may receive data from scheduling module 362 to create its log. Controller 300 and circuit 350 is further shown to include a timer 364 that may be used by circuit 350 to maintain a date/time for use by or for checking against information of scheduling module 362, end of life module 360, or logging module 358. Environment processing module 366 may be configured to process signals received from one or more sensors such as environment sensor 318. Environment sensing module 366 may be configured to, for example, keep the lamp of the lighting fixture turned off between the hours of one and five A.M. if there is no movement detected by a nearby environment sensor. In other embodiments, environment sensing module 366 may interpret the signals received from sensors but may not make final fixture behavior determinations. In such embodiments, a main logic module for the circuit or logic included in processor 352 or memory 354 may make the fixture behavior determinations using input from, for example, environment processing module 366, scheduling module 362, timer 364, and fixture data 368. In an exemplary embodiment scheduling module 362 can complete or initiate scheduled activities relating to camera circuit 330 and camera 309. For example, scheduling module 362 may orient a PTZ camera in a first direction for morning rush hour traffic and the PTZ camera in a second direction for evening rush hour traffic. The directional switch may be scheduled to occur at, e.g., 3:30 p.m and again at 3:30 a.m. In another example, the scheduling module 362 may schedule transmissions of video information from camera circuit 330 to a remote source via radio frequency transceiver 306. In an outdoor lighting fixture network with many cameras and radio frequency transceivers, such transmissions may be scheduled in a staggered manner by a master controller or master transceiver and the particular schedules for each individual outdoor lighting fixture may be enforced by each outdoor lighting fixture's scheduling module 362.

Controller 300 is shown to include power relays 302 configured to controllably switch on or off high voltage power outputs that may be provided to first ballast 244 and second ballast 246 of FIG. 3A via wires 320, 321. It should be noted that in other exemplary embodiments, power relays 302 may be configured to provide a low voltage control signal, optical signal, or otherwise to the lighting fixture which may cause one or more ballasts, lamps, and/or circuits of the fluorescent lighting fixture that the controller serves to turn on and off. While power relays 302 are configured to provide high voltage power outputs to ballasts 244, 246, it should be appreciated that controller 300 may include a port, terminal, receiver, or other input for receiving power from a high voltage power source. In embodiments where a relatively low voltage or no voltage control signal is provided by relays 302, power for circuitry of controller 300 may be received from a power source provided to the lighting fixtures or from another source. In any embodiment of controller 300, appropriate power supply circuitry (e.g., filtering circuitry, stabilizing circuitry, etc.) may be included with controller 300 to provide power to the components of controller 300 (e.g., relays 302). When sensor 318 experiences an environmental condition, logic module 314 may determine whether or not circuit 350 should change "on/off" states of the lighting fixture. For example, if a high ambient lighting level is detected by sensor 318, logic module 314 may determine that circuit 350 should change states such that power relays 302 are "off." Conversely, if a low ambient lighting level is detected by sensor 318, logic module 314 may cause circuit 350 to turn power relays 302 "on." Other control decisions, logic and activities provided by circuit 350 and wireless controller 305 and the components thereof are described herein and with reference to other Figures.

Referring still to FIG. 3B, controller 300 is shown to include wireless controller 305 and RF transceiver 306 which receives and provides data or control signals from/to circuit 350. A command to turn the lighting fixture "off" may be received at wireless transceiver 306 and interpreted by wireless controller 305. Upon recognizing the "off" command, wireless controller 305 provides an appropriate control signal to circuit 350 which causes one or more of power relays 302 to switch off. Wireless controller 305 may also be configured to resolve transmission failures, reception failures, and the like. For example, wireless controller 305 may respond to such failures by, for example, operating according to a retransmission scheme or another transmit failure mitigation scheme. Wireless controller 305 may also control any other modulating, demodulating, coding, decoding, routing, or other activities of RF transceiver 306. For example, controller 300's control logic (e.g., controlled by logic module 314) may periodically include making transmissions to other controllers in a zone, making transmissions to particular controllers, or otherwise. Such transmissions can be controlled by wireless controller 305 and such control may include, for example, maintaining a token-based transmission system, synchronizing clocks of the various RF transceivers or controllers, operating under a slot-based transmission/reception protocol, or otherwise. In the present disclosure, the term transceiver may refer to an integrated transmitter and receiver pair or a separate transmitter and receiver.

Referring still to FIG. 3B, sensor 318 may be an infrared sensor, an optical sensor, a camera, a temperature sensor, a photodiode, a carbon dioxide sensor, or any other sensor configured to sense environmental conditions such as motion, lighting level or human occupancy of a space. In one exemplary embodiment, sensor 318 is a motion sensor and logic module 314 is configured to determine whether to change states of the lighting fixture based on whether sensor 318 indicates motion (e.g., signals from sensor 318 reach or exceed a threshold value for a period of time). Logic module 314 may also or alternatively be configured to use the signal from sensor 318 to determine an ambient lighting level for an area. Logic module 314 may then determine whether to change states based on the ambient lighting level. For example, logic module 314 may use a condition such as time of day in addition to ambient lighting level to determine whether to turn the lighting fixture off or on. During a critical time of the day (e.g., when a staffed assembly line is moving), even if the ambient lighting level is high, logic module 314 may refrain from turning the lighting fixture off. In another embodiment, by way of further example, logic module 314 is configured to provide a command to command and control module 356 that is configured to cause circuit 350 to turn the one or more lamps of the fluorescent lighting fixture on when logic module 314 detects motion via the signal from sensor 318 and when logic circuit 314 determines that the ambient lighting level is below a threshold setpoint. Logic module 314 may also provide the determination of motion to camera circuit 330 for action. Camera circuit 330 may respond to the receipt of an indication of motion by changing an operating state of camera circuit 330 or camera 309. For example, camera circuit 330 may designate incoming video information as relating to motion, recording "start motion" and "stop motion" metadata in memory 334.

Sensor interface 312 may be configured to receive signals from environment sensor 318. Sensor interface 312 may include any number of jacks, terminals, solder points or other connectors for receiving a wire or lead from environment sensor 318. Sensor interface 312 may also or alternatively be a radio frequency transceiver or receiver for receiving signals from wireless sensors. For example, sensor interface 312 may be a Bluetooth protocol compatible transceiver, a ZigBee transceiver, or any other standard or proprietary transceiver. Regardless of the communication medium used, sensor interface 312 may include filters, analog to digital converters, buffers, or other components configured to handle signals received from environment sensor 312. Sensor interface 312 may be configured to provide the result of any signal transformation (or the raw signal) to circuit 350 for further processing.

Referring further to FIG. 3B, logic module 314 may include a restrike violation module (e.g., in memory 316) that is configured to prevent logic module 314 from commanding circuit 350 to cause the fluorescent lamps to turn on while a restrike time is counted down. The restrike time may correspond with a maximum cool-down time for the lamp—allowing the lamp to experience its preferred strike-up cycle even if a command to turn the lamp back on is received at RF transceiver 306. In other embodiments, logic module 314 may be configured to prevent rapid on/off switching due to sensed motion, another environmental condition, or a sensor or controller error. Logic module 314 may be configured to, for example, entirely discontinue the on/off switching based on inputs received from the sensor by analyzing the behavior of the sensor, the switching, and a logged usage information. By way of further example, logic circuit 314 may be configured to discontinue the on/off switching based on a determination that switching based on the inputs from the sensor has occurred too frequently (e.g., exceeding a threshold number of "on" switches within a predetermined amount of time, undesired switching based on the time of day or night, etc.). Logic module 314 may be configured to log or communicate such a determination. Using such configurations, logic module 314 is configured to self-diagnose and correct undesirable behavior that would otherwise continue occurring based on the default, user, or system-configured settings.

Figure 3C:
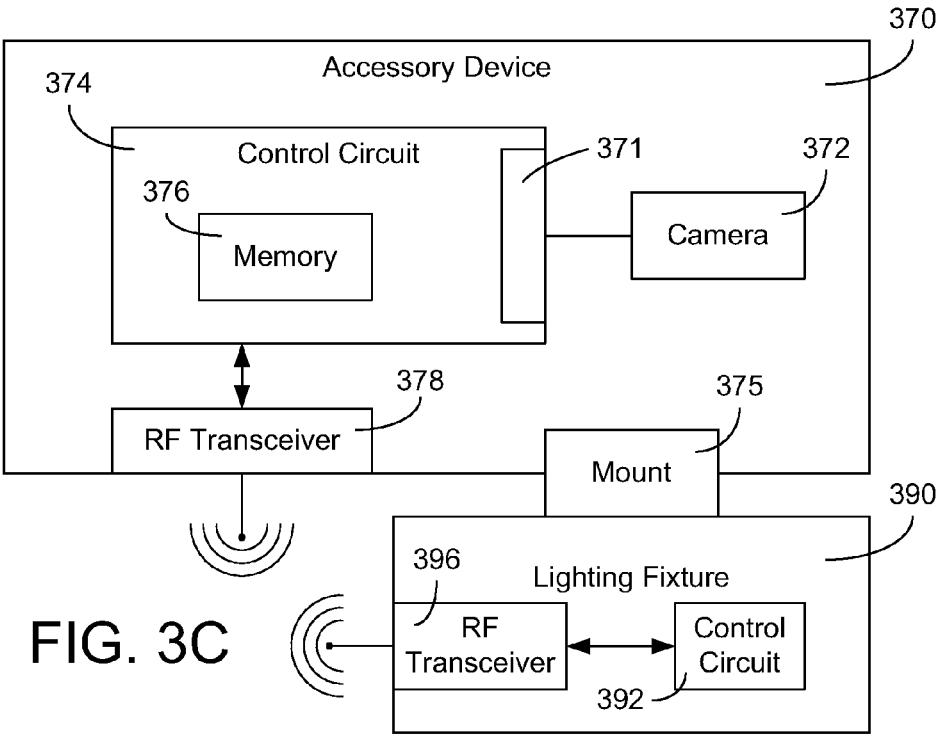
FIG. 3C is a block diagram of an accessory device including a camera for communicating with a lighting fixture via a wireless connection, according to an exemplary embodiment.

Referring now to FIG. 3C, an accessory device 370 is shown, according to an exemplary embodiment. Accessory device 370 is for use with an outdoor lighting fixture 390 having a radio frequency transceiver 396 for communicating data to a remote source. The outdoor lighting fixture, in such embodiments, does not include a camera. Accessory device 370 includes a camera 372, a control circuit 374, and an RF transceiver 378. Accessory device 370 can also include a mount 375 for holding camera 372 to outdoor lighting fixture 390 or a pole for the outdoor lighting fixture. Control circuit 374 is wired to camera 372 via interface 371 and includes memory 376 for storing video from the camera 372. Camera 372 may have the same functionality as described in the present disclosure.

Camera 372 is configured to capture images and video and provide the images and video to control circuit 374. Control circuit 374 stores the images and video in memory 376. Control circuit 374 further provides the images and video to RF transceiver 378. RF transceiver 378 is wired to control circuit 374 and wirelessly transmits the images and video to RF transceiver 396 of lighting fixture 390. Control circuit 392 of lighting fixture 390 may then receive and process the images and video or continue transmitting the video information to a remote source.

Figure 3D:
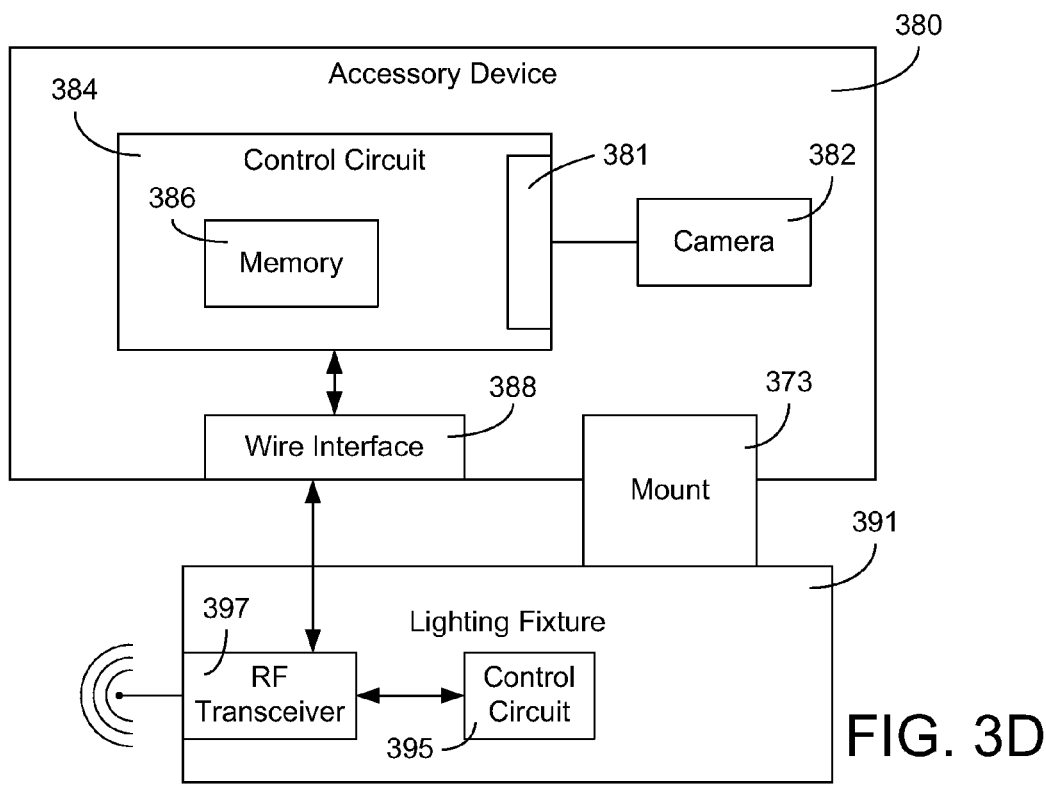
FIG. 3D is a block diagram of an accessory device including a camera for communicating with a lighting fixture via a wired connection, according to an exemplary embodiment.

Referring now to FIG. 3D, an accessory device 380 for use with an outdoor lighting fixture 391 is shown, according to an exemplary embodiment. Accessory device 380, as opposed to accessory device 370 shown in FIG. 3C, includes a wired interface 388 for wiring the accessory device's control circuit 384 to radio frequency transceiver 397 of outdoor lighting fixture 391. Accessory device 380 includes a camera 382 for capturing images, video, or images and video. Control circuit 384 includes a wired interface 381 to camera 382 and includes memory 386 for storing the captured images, video or images and video received from the camera 382 via wired interface 381. Accessory device 380 further includes a mount 373 for holding camera 382 to outdoor lighting fixture 391 or a pole for the outdoor lighting fixture. Wired interface 388 provides the images and video received at control circuit 384 to RF transceiver 397 of lighting fixture 391. Control circuit 395 of lighting fixture 391 is coupled to RF transceiver 397. Control circuit 395 causes the transmission of the received video information by RF transceiver 397.

Figure 4A:
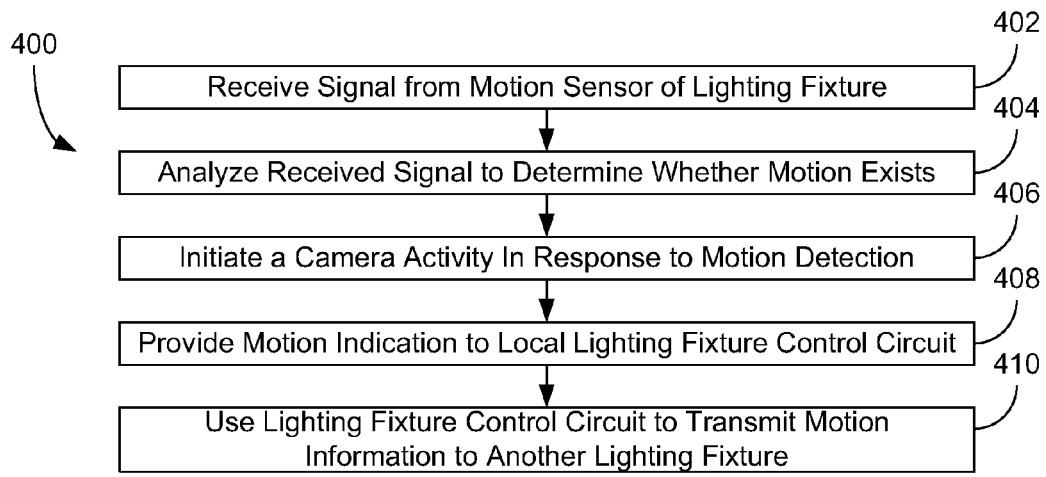
FIG. 4A is a flow chart of a process for activating a camera based on a motion sensor indication, according to an exemplary embodiment.

Referring now to FIG. 4A, a flow chart of a process 400 for activating a camera based on a motion sensor is shown, according to an exemplary embodiment. Process 400 includes receiving a signal from a motion sensor of the lighting fixture (step 402). Process 400 further includes analyzing the received signal to determine whether motion exists (step 404). Process 400 further includes initiating a camera activity in response to motion detection (step 406). The camera activity may be turning the camera on, beginning recording with the camera, tracking an object in motion, or recording video for the duration of time the object is in view of the camera. Process 400 further includes providing a motion indication to a local lighting fixture control circuit (step 408). The lighting fixture control circuit may use the information to turn on a ballast or lamp for illuminating an outdoor area. Process 400 further includes transmitting the motion information to another lighting fixture (step 410). The next lighting fixture can further transmit the indication of motion or can use the indication of motion to determine whether to change lighting states (e.g., turn on one or more ballasts, brighten from a dimmed state, etc.).

Figure 4B:
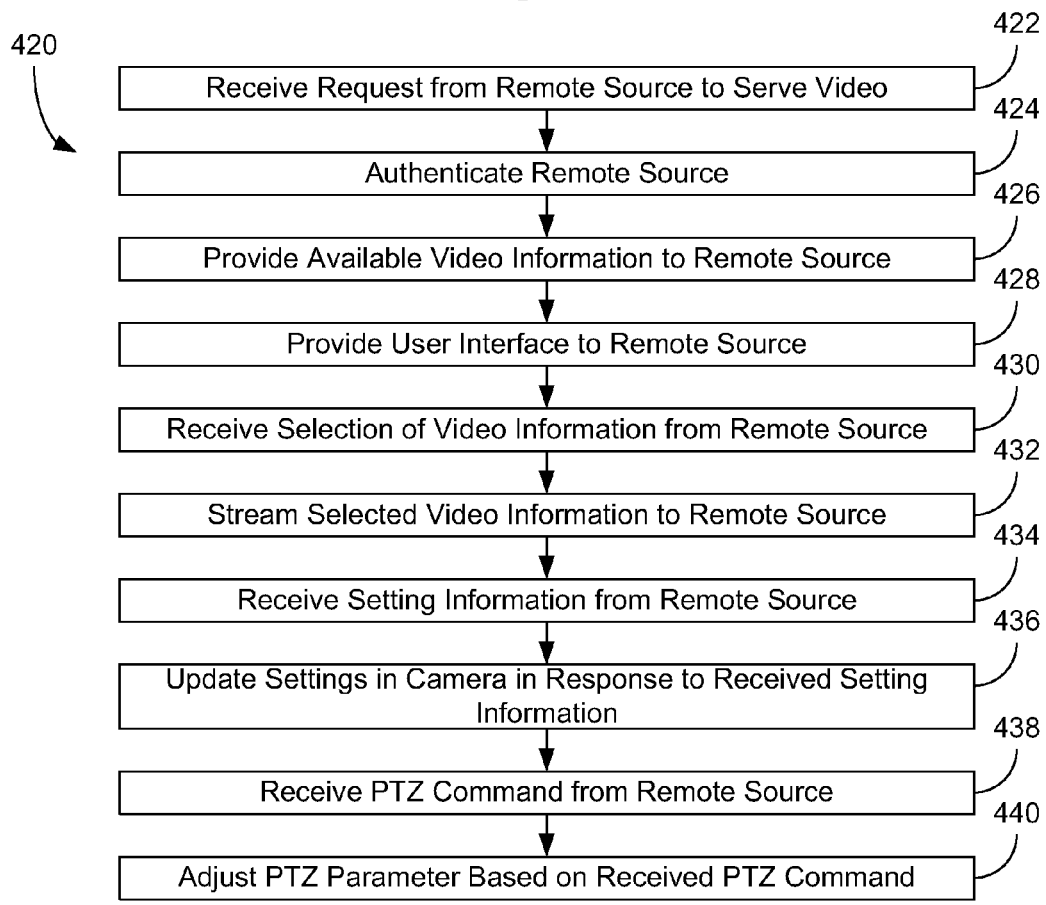
FIG. 4B is a flow chart of a process for providing video information to a remote source, according to an exemplary embodiment.

Referring now to FIG. 4B, a flow chart of a process 420 for providing video information to a remote source is shown, according to an exemplary embodiment. Process 420 includes receiving a request from the remote source to serve video (step 422). The request may originate from a user interface, from an automated process for periodically serving video, or may be based on a condition sensed by the outdoor lighting fixture (e.g., in response to detected motion). Process 420 further includes authenticating the remote source (step 424). The authentication may include verifying that the remote source or a user of the remote source has permission to view the video (e.g., via a user ID or other identification method) or verifying security settings of the remote source. Process 420 further includes providing available video information to the remote source (step 426).

Process 420 further includes providing a user interface to the remote source (step 428). The user interface may be used to provide a display for a user of the remote source to view the video. Process 420 further includes receiving a selection of video information from the remote source (step 430). The selection of video information may include a request to view a specific video, specific portions of a video, meta information (e.g., a timestamp or timeframe) of the selected video, or other video-related requests. The selected video information is streamed to the remote source (step 432) in response to the selection. Step 432 may include various pre-processing tasks. For example, pre-processing tasks may include compressing the video for streaming, packetizing the video for streaming, and wrapping the packetized video according to a video streaming protocol compatible with the remote source.

Process 420 further includes receiving setting information from the remote source (step 434). Setting information may include various camera settings (e.g., video recording settings such as a resolution of the video, brightness or color settings, instructions for recording an object in the view of the camera, etc.). In response to the received setting information, settings in the camera are updated (step 436). Process 420 further includes receiving PTZ commands from the remote source (step 438) and adjusting PTZ parameters of the camera based on the received commands (step 440). PTZ commands may include an adjustment of the panning of the camera, the tilt of the camera, or the zoom level of the camera.

The user interface of process 420 may include various controls for a user for providing a selection. For example, buttons that a user may click to change the tilt or zoom of the camera may be provided on the user interface, the user interface may show multiple camera views such that a user can select a specific camera view, etc.

Figure 5:
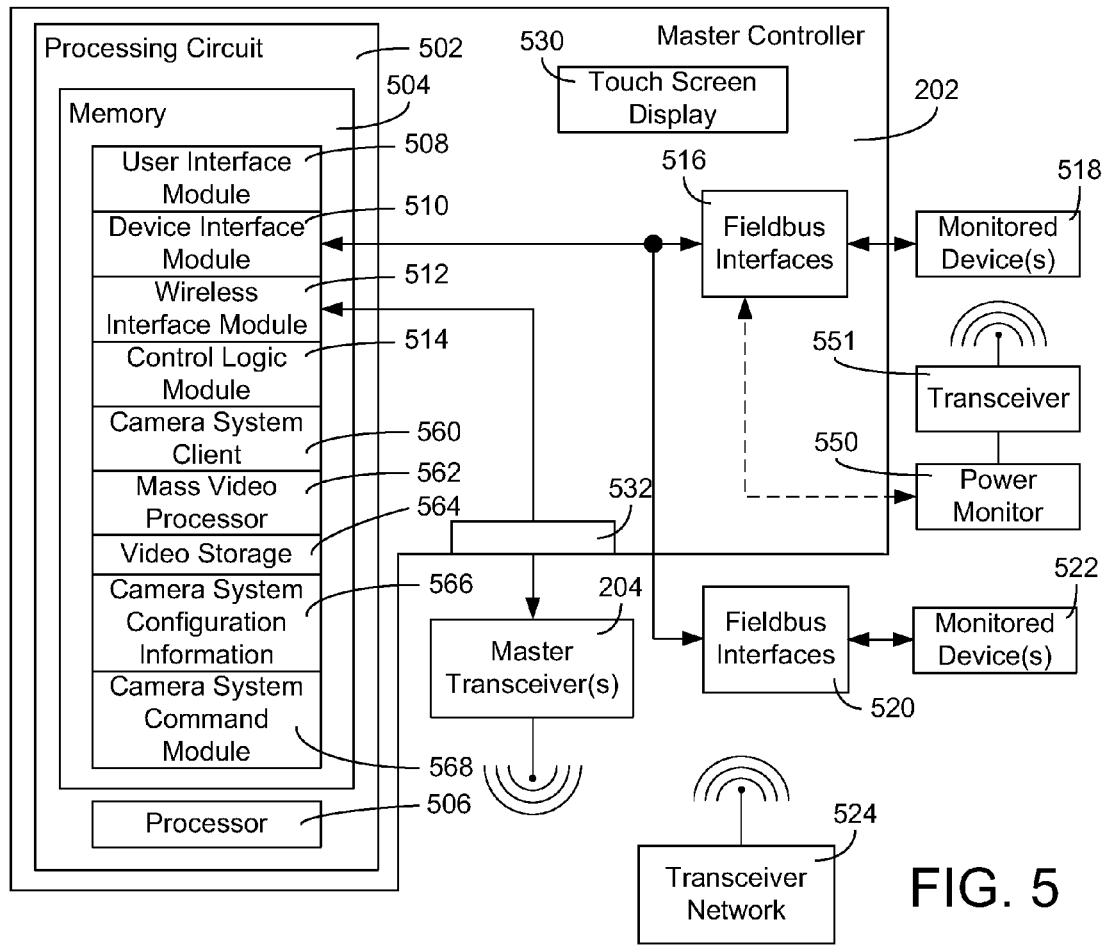
FIG. 5 is a more detailed block diagram of the master controller of FIG. 3A, according to an exemplary embodiment.

Referring now to FIG. 5, a more detailed block diagram of master controller 202 is shown, according to an exemplary embodiment. Master controller 202 (e.g., a control computer) may be configured as the "master controller" described in U.S. application Ser. No. 12/240,805, filed Sep. 29, 2008, and incorporated herein by reference in its entirety. Master controller 202 is generally configured to receive user inputs (e.g., via touchscreen display 530) and to set or change settings of the camera or lighting system based on the user inputs.

Referring further to FIG. 5, master controller 202 is shown to include processing circuit 502 including memory 504 and processor 506. In an exemplary embodiment, master controller 202 and more particularly processing circuit 502 are configured to run a Microsoft Windows Operating System (e.g., XP, Vista, etc.) and are configured to include a software suite configured to provide the features described herein. The software suite may include a variety of modules (e.g., modules 508-514) configured to complete various activities of master controller 202. Modules 508-514 may be or include computer code, analog circuitry, one or more integrated circuits, or another collection of logic circuitry. In various exemplary embodiments, processor 506 may be a general purpose processor, a specific purpose processor, a programmable logic controller (PLC), a field programmable gate array, a combination thereof, or otherwise and configured to complete, cause the completion of, and/or facilitate the completion of the activities of master controller 202 described herein. Memory 504 may be configured to store historical data received from lighting fixture controllers or other building devices, configuration information, schedule information, setting information, zone information, or other temporary or archived information. Memory 504 may also be configured to store computer code for execution by processor 506. When executed, such computer code (e.g., stored in memory 504 or otherwise, script code, object code, etc.) configures processing circuit 502, processor 506 or more generally master controller 202 for the activities described herein.

Touch screen display 530 and more particularly user interface module 508 are configured to allow and facilitate user interaction (e.g., input and output) with master controller 202. It should be appreciated that in alternative embodiments of master controller 202, the display associated with master controller 202 may not be a touch screen, may be separated from the casing housing the control computer, and/or may be distributed from the control computer and connected via a network connection (e.g., Internet connection, LAN connection, WAN connection, etc.). Further, it should be appreciated that master controller 202 may be connected to a mouse, keyboard, or any other input device or devices for providing user input to master controller 202. Control computer is shown to include a communications interface 532 configured to connect to a wire associated with master transceiver 204.

Communications interface 532 may be a proprietary circuit for communicating with master transceiver 204 via a proprietary communications protocol. In other embodiments, communications interface 532 may be configured to communicate with master transceiver 204 via a standard communications protocol. For example, communications interface 532 may include Ethernet communications electronics (e.g., an Ethernet card) and an appropriate port (e.g., an RJ45 port configured for CAT5 cabling) to which an Ethernet cable is run from master controller 202 to master transceiver 204. Master transceiver 204 may be as described in U.S. application Ser. Nos. 12/240,805, 12/057,217, or 11/771,317 which are each incorporated herein by reference. Communications interface 532 and more generally master transceiver 204 are controlled by logic of wireless interface module 512. Wireless interface module 512 may include drivers, control software, configuration software, or other logic configured to facilitate communications activities of master controller 202 with lighting fixture controllers. For example, wireless interface module 512 may package, address format, or otherwise prepare messages for transmission to and reception by particular controllers or zones. Wireless interface module 512 may also interpret, route, decode, or otherwise handle communications received at master transceiver 204 and communications interface 532.

Referring still to FIG. 5, user interface module 508 may include the software and other resources for the display and the handling of automatic or user inputs received at the graphical user interfaces of master controller 202. While user interface module 508 is executing and receiving user input, user interface module 508 may interpret user input and cause various other modules, algorithms, routines, or sub-processes to be called, initiated, or otherwise affected. For example, control logic module 514 and/or a plurality of control sub-processes thereof may be called by user interface module 508 upon receiving certain user input events. User interface module 508 may also include server software (e.g., web server software, remote desktop software, etc.) configured to allow remote access to the display. User interface module 508 may be configured to complete some of the control activities described herein rather than control logic module 514. In other embodiments, user interface module 508 merely drives the graphical user interfaces and handles user input/output events while control logic module 514 controls the majority of the actual control logic.

Control logic module 514 may be the primary logic module for master controller 202 and may be the main routine that calls, for example, modules 508, 510, etc. Control logic module 514 may generally be configured to provide lighting control, energy savings calculations, demand/response-based control, load shedding, load submetering, HVAC control, building automation control, workstation control, advertisement control, power strip control, "sleep mode" control, or any other types of control. In an exemplary embodiment, control logic module 514 operates based off of information stored in one or more databases of master controller 202 and stored in memory 504 or another memory device in communication with master controller 202. The database may be populated with information based on user input received at graphical user interfaces and control logic module 514 may continuously draw on the database information to make control decisions. For example, a user may establish any number of zones, set schedules for each zone, create ambient lighting parameters for each zone or fixture, etc. This information is stored in the database, related (e.g., via a relational database scheme, XML sets for zones or fixtures, or otherwise) and recalled by control logic module 514 as control logic module 514 proceeds through its various control algorithms.

Control logic module 514 may include any number of functions or sub-processes. For example, a scheduling sub-process of control logic module 514 may check at regular intervals to determine if an event is scheduled to take place. When events are determined to take place, the scheduling sub-process or another routine of control logic module 514 may call or otherwise use another module or routine to initiate the event. For example, if the schedule indicates that a zone should be turned off at 5:00 pm, then when 5:00 pm arrives the scheduling sub-process may call a routine (e.g., of wireless interface module) that causes an "off" signal to be transmitted by master transceiver 204. Control logic module 514 may also be configured to conduct or facilitate the completion of any other process, sub-process, or process steps conducted by master controller 202 described herein.

Referring further to FIG. 5, device interface module 510 facilitates the connection of one or more field devices, sensors, or other inputs not associated with master transceiver 204. For example, fieldbus interfaces 516, 520 may be configured to communicate with any number of monitored devices 518, 522. The communication may be according to a communications protocol which may be standard or proprietary and/or serial or parallel. Fieldbus interfaces 516, 520 can be or include circuit cards for connection to processing circuit 502, jacks or terminals for physically receiving connectors from wires coupling monitored devices 518, 522, logic circuitry or software for translating communications between processing circuit 502 and monitored devices 518, 522, or otherwise. In an exemplary embodiment, device interface module 510 handles and interprets data input from the monitored devices and controls the output activities of fieldbus interfaces 516, 520 to monitored devices 518, 522.

Fieldbus interfaces 516, 520 and device interface module 510 may also be used in concert with user interface module 508 and control logic module 514 to provide control to the monitored devices 518, 522. For example, monitored devices 518, 522 may be mechanical devices configured to operate a motor, one or more electronic valves, one or more workstations, machinery stations, a solenoid or valve, or otherwise. Such devices may be assigned to zones similar to the lighting fixtures described above and below or controlled independently. User interface module 508 may allow schedules and conditions to be established for each of devices 518, 522 so that master controller 202 may be used as a comprehensive energy management system for a facility. For example, a motor that controls the movement of a spinning advertisement may be coupled to the power output or relays of a controller similar to controller 300 of FIG. 3B or otherwise. This controller may be assigned to a zone (e.g., via user interfaces at touchscreen display 530) and provided a schedule for turning on and off during the day. In another embodiment, the electrical relays of the controller may be coupled to other building devices such as video monitors for informational display, exterior signs, task lighting, audio systems, or other electrically operated devices.

Referring further to FIG. 5, power monitor 550 is shown as coupled to fieldbus interfaces 516 in an exemplary embodiment. However, power monitor 550 may also or alternatively be coupled to its own controller or RF transceiver 551 for communicating with master transceiver 204. Power monitor 550 may generally be configured to couple to building power resources (e.g., building mains input, building power meter, etc.) and to receive or calculate an indication of power utilized by the building or a portion of the building. This input may be received in a variety of different ways according to varying embodiments. For example, power monitor 550 may include a current transformer (CT) configured to measure the current in the mains inlet to a building, may be coupled to or include a pulse monitor, may be configured to monitor voltage, or may monitor power in other ways. Power monitor 550 is intended to provide "real time" or "near real time" monitoring of power and to provide the result of such monitoring to master controller 202 for use or reporting. When used with power monitor 550, control logic module 514 may be configured to include logic that sheds loads (e.g., sends off signals to lighting fixtures via a lighting fixture controller network, sends off signals to monitored devices 518, 522, adjusts ambient light setpoints, adjusts schedules, shuts lights off according to a priority tier, etc.) to maintain a setpoint power meter level or threshold. In other exemplary embodiments, control logic module 514 may store or receive pricing information from a utility and shed loads if the metered power usage multiplied by the pricing rate is greater than certain absolute thresholds or tiered thresholds. For example, if daily energy cost is expected to exceed $500 for a building, control logic module 514 may be configured to change the ambient light setpoints for the lighting fixtures in the building until daily energy cost is expected to fall beneath $500. In an exemplary embodiment, user interface module 508 is configured to cause a screen to be displayed that allows a user to associate different zones or lighting fixtures with different demand/response priority levels. Accordingly, a utility provider or internal calculation determines that a load should be shed, control logic module 514 will check the zone or lighting fixture database to shed loads of the lowest priority first while leaving higher priority loads unaffected.

Referring further to FIG. 5, master controller 202 and memory 504 includes various modules 560-568 for camera operation. Memory 504 includes camera system client 560. Camera system client 560 is configured to manage the various cameras that wirelessly communicate with master controller 202. For example, camera system client 560 may include identifying cameras (e.g., a name or ID of the camera, the type of camera), identifying a zone or area associated with the cameras (e.g., grouping cameras together based on the location and functionality of the cameras), identifying a function of the cameras (e.g., identifying cameras configured to record video, cameras configured to record specific events, etc.), or otherwise. For example, camera system client 560 may group all cameras in a zone and provide camera information for each camera in the zone to the other modules of master controller 202 or to a remote source via master transceiver 204. Further, camera system client 560 may be used to sort cameras such that a user of touch screen display 530 may find and view all cameras in a specific zone, all cameras with a specific functionality, etc.

Master controller 202 further includes mass video processor 562. Mass video processor 562 processes video or video information provided by the cameras wirelessly communicating with master controller 202. Mass video processor 562 may include processing the video for playback on a user interface, for display as part of a display (e.g., a display provided by touch screen display 530), or other video processing for providing video or video information to a device or user wirelessly communicating with master controller 202.

Master controller 202 further includes video storage 564. Video storage 564 stores various camera data (e.g., video or photos) received by master controller 202 or camera data to be transmitted wirelessly to cameras communicating with master controller 202. Video storage 564 may include storage of videos, photos, camera configuration information, a history of usage of the cameras, etc.

Master controller 202 further includes camera system configuration information 566. Camera system configuration information 566 provides configurations for the various cameras that wirelessly communicate with master controller 202. Configuration information may include camera positioning (e.g., adjusting the tilt or zoom of a PTZ camera), resolution or other video quality properties, or other configuration information as described in the present disclosure.

Master controller 202 further includes camera system command module 568. Camera system command module 568 is configured to provide commands to various cameras that may wirelessly communicate with master controller 202. Commands provided to the cameras may include instructions for the camera to record an event, instructions relating to the time and duration of the recording, or other camera instructions as described in the present disclosure.

Figure 6:
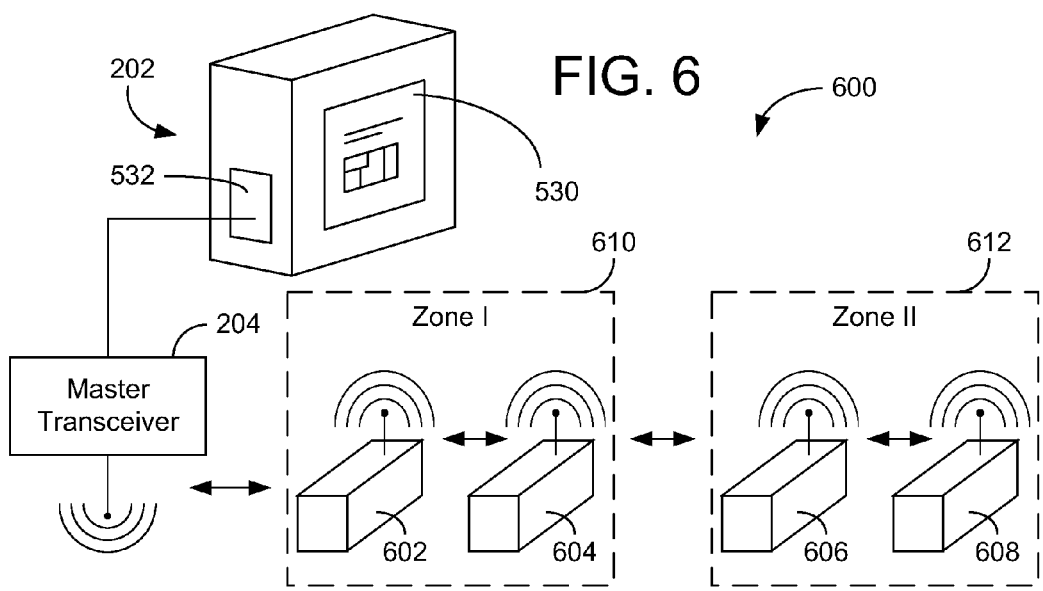
FIG. 6 is a diagram of a zone system for a facility lighting system, according to an exemplary embodiment.

Referring now to FIG. 6, a diagram of a zone system for a facility lighting system 600 is shown, according to an exemplary embodiment. Facility lighting system 600 is shown to include master controller 202 that is configured to conduct or coordinate control activities as described in FIG. 5.

Master controller 202 is preferably configured to provide a graphical user interface to a local or remote electronic display screen for allowing a user to adjust control parameters, turn lighting fixtures on or off, or to otherwise affect the operation of lighting fixtures in a facility. For example, master controller 202 includes touch screen display 530 for displaying such a graphical user interface and for allowing user interaction (e.g., input and output) with master controller 202. Touch screen display 530 is configured to provide a user with a display for viewing and managing lighting fixture and camera settings. For example, referring also to FIG. 3B, master controller 202 may receive data from camera circuit 330 and may provide the data to touch screen display 530. Touch screen display 530 may then be configured to provide a user interface for a user to provide camera settings and commands as described in the embodiment of FIG. 3B.

It should be noted that while master controller 202 is shown in FIG. 6 as housed in a wall-mounted panel it may be housed in or coupled to any other suitable computer casing or frame. The user interfaces are intended to provide an easily configurable lighting system and/or camera system for an environment such as the environment shown in FIG. 2. The user interfaces are intended to allow even untrained users to reconfigure or reset a lighting system or camera system using relatively few clicks. In an exemplary embodiment, the user interfaces do not require a keyboard for entering values. Advantageously, users other than building managers may be able to setup, interact with, or reconfigure the systems using the provided user interfaces.

Referring further to FIG. 6, master controller is shown as connected to master transceiver 204 via communications interface 532. Master transceiver 204 may be a radio frequency transceiver configured to provide wireless signals to a network of controllers. In FIG. 6, master transceiver 204 is shown in bi-directional wireless communication with a plurality of lighting fixture controllers 602, 604, 606, 608. FIG. 6 further illustrates controllers 602, 604 forming a first logical group 610 identified as "Zone I" and controllers 606, 608 forming a second logical group 612 identified as "Zone II." Master controller 202 may be configured to provide different processing or different commands for zones 610, 612. While master controller 202 is configured to complete a variety of control activities for lighting fixture controllers 602, 604, 606, 608, in many exemplary embodiments of the present disclosure, each controller associated with a lighting fixture (e.g., controllers 602, 604, 606, 608) includes circuitry configured to provide a variety of "smart" or "intelligent features" that are either independent of master controller 202 or operate in concert with master controller 202. In the embodiment of FIG. 6, each lighting fixture may include or be coupled to a camera and may provide commands received from master controller 202 to its associated camera, or each zone may include a camera to which master controller 202 communicates with instead of a lighting fixture. According to various exemplary embodiments, any number of lighting fixtures and/or cameras may be included in a particular zone.

According to an exemplary embodiment, different camera and lighting fixture settings may be provided to zones 610, 612. For example, one set of camera and lighting fixture settings may be provided to zone 610 in response to a vehicle traveling through zone 610 (e.g., instructions for recording vehicle movement and providing light for the vehicle) while a second set of camera settings may be provided to zone 612 (e.g., instructions for turning lighting fixtures 606, 608 on to a dimmed state while positioning cameras to detect and pick up the vehicle if the vehicle enters zone 612). According to various exemplary embodiments, master controller 202 may provide the same camera and lighting fixture settings to each lighting fixture and camera in a zone, may provide different camera settings for different cameras and lighting fixtures of the zone, or otherwise.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure. In alternative exemplary embodiments the lighting fixtures shown and described throughout this application may be configured or modified for indoor use. For example, rather than including a mounting system for coupling the lighting fixture to a street pole, the lighting fixtures in alternative embodiments may include a mounting system for coupling the lighting fixture to a an indoor ceiling mount or an indoor wall mount. Such camera-integrated indoor lighting fixtures may be used be used in warehouses, manufacturing facilities, sporting arenas, airports, or other environments.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An outdoor lighting fixture comprising:
   a ballast for controlling the amount of current provided to a lamp;
   a fixture housing at least partially surrounding the ballast and the lamp;
   a mounting system for holding the fixture housing to at least one of a wall and a pole;
   a camera coupled to the housing and configured to capture at least one of image data or video data;
   a control circuit wired to the camera; and
   a radio frequency transceiver wired to the control circuit, wherein the control circuit is configured to cause the at least one of the image data or video data captured by the camera to be wirelessly transmitted by the radio frequency transceiver;
   wherein the outdoor lighting fixture is configured to illuminate an area underneath the outdoor lighting fixture.

2. The outdoor lighting fixture of claim 1, further comprising:
   a power supply providing power to the ballast, the camera, the control circuit and the radio frequency transceiver.

3. The outdoor lighting fixture of claim 1, further comprising:
   a motion sensor coupled to the outdoor lighting fixture and wired to the control circuit;
   wherein the control circuit changes an operational state associated with the camera in response to a determination of motion, wherein the control circuit makes the determination of motion using a signal from the motion sensor.

4. The outdoor lighting fixture of claim 3, wherein changing an operational state associated with the camera comprises at least one of powering-up the camera, storing video captured by the camera in a persistent memory device of the outdoor lighting fixture, marking the video, and transmitting the video to a remote source.

5. The outdoor lighting fixture of claim 3, wherein the control circuit is further configured to cause an indication of motion to be transmitted to a remote source in response to the determination of motion.

6. The outdoor lighting fixture of claim 5, wherein the control circuit and the radio frequency transceiver are configured to broadcast the indication of motion to a network of radio frequency transceivers associated with other outdoor lighting fixtures.

7. The outdoor lighting fixture of claim 5, wherein the control circuit and the radio frequency transceiver are configured to transmit the indication of motion to the remote source with at least one of an outdoor lighting fixture identifier and a zone identifier associated with the outdoor lighting fixture.

8. The outdoor lighting fixture of claim 1, wherein the control circuit comprises a video streaming module configured to use the radio frequency transceiver to stream video information to a remote source.

9. The outdoor lighting fixture of claim 1, wherein the radio frequency transceiver is configured for peer-to-peer communication with other radio frequency transceivers of other outdoor lighting fixtures and wherein the control circuit is configured to cause the at least one of the image data or video data captured by the camera to be wirelessly transmitted to the remote source via the peer-to-peer communication with the other radio frequency transceivers of the other outdoor lighting fixtures.

10. A kit for installing on an outdoor lighting fixture pole, comprising:
    an outdoor lighting fixture configured for mounting to the outdoor lighting fixture pole and having a ballast and at least one lamp, wherein the outdoor lighting fixture is configured to illuminate an area underneath the outdoor lighting fixture;
    a radio frequency transceiver for wirelessly communicating lighting commands and lighting information to a remote source;
    a camera for mounting to at least one of the outdoor lighting fixture and the outdoor lighting fixture pole; and
    a control circuit for wiring to the camera and the radio frequency transceiver, the control circuit configured to cause video information from the camera to be transmitted by the radio frequency transceiver.

11. The kit of claim 10, further comprising:
    a power supply providing power to the ballast, the camera, the control circuit and the radio frequency transceiver.

12. The kit of claim 10, further comprising:
    a motion sensor coupled to the outdoor lighting fixture and wired to the control circuit;
    wherein the control circuit changes an operational state associated with the camera in response to a determination of motion, wherein the control circuit makes the determination of motion using a signal from the motion sensor.

13. The kit of claim 12, wherein changing an operational state associated with the camera comprises at least one of powering-up the camera, storing video captured by the camera in a persistent memory device of the outdoor lighting fixture, marking the video, and transmitting the video to a remote source.

14. The kit of claim 12, wherein the control circuit is further configured to cause an indication of motion to be transmitted to a remote source in response to the determination of motion.

15. The kit of claim 12, wherein the control circuit and the radio frequency transceiver are configured to broadcast the indication of motion to a network of radio frequency transceivers associated with other outdoor lighting fixtures.

16. The kit of claim 12, wherein the control circuit and the radio frequency transceiver are configured to transmit the indication of motion to the remote source with at least one of an outdoor lighting fixture identifier and a zone identifier associated with the outdoor lighting fixture.

17. The kit of claim 10, wherein the control circuit comprises a video streaming module configured to use the radio frequency transceiver to stream video information to a remote source.

18. The kit of claim 10, wherein the radio frequency transceiver is configured for peer-to-peer communication with other radio frequency transceivers of other outdoor lighting fixtures and wherein the control circuit is configured to cause the information from the camera to be wirelessly transmitted to the remote source via the peer-to-peer communication with the other radio frequency transceivers of the other outdoor lighting fixtures.

19. An outdoor lighting fixture having a radio frequency transceiver for communicating data information to a remote source, the outdoor lighting fixture comprising:

a camera;

a mount for holding the camera to at least one of the outdoor lighting fixture or a pole for the outdoor lighting fixture;

a control circuit wired to the camera and including memory for storing video from the camera; and an interface for wiring the control circuit to the radio frequency transceiver of the outdoor lighting fixture;

wherein the control circuit is configured to receive video information from the camera and to provide the video information to the radio frequency transceiver via the interface and for communication to the remote source; and wherein the outdoor lighting fixture is configured to illuminate an area underneath the outdoor lighting fixture.

20. The outdoor lighting fixture of claim 19, wherein the camera is operable for capturing images, video, or images and video; and wherein the control circuit is configured to cause the stored images, video, or images and video to be wirelessly transmitted by the radio frequency transceiver.

* * * * *